United States Patent
Sonoda et al.

(10) Patent No.: US 9,935,876 B2
(45) Date of Patent: Apr. 3, 2018

(54) COMMUNICATION SYSTEM, CONTROL APPARATUS, COMMUNICATION APPARATUS, COMMUNICATION CONTROL METHOD, AND PROGRAM

(71) Applicants: Kentaro Sonoda, Tokyo (JP); Hideyuki Shimonishi, Tokyo (JP); Toshio Koide, Tokyo (JP); Yoichi Hatano, Tokyo (JP); Masayuki Nakae, Tokyo (JP); Masaya Yamagata, Tokyo (JP); Yoichiro Morita, Tokyo (JP); Takayuki Sasaki, Tokyo (JP); Yuki Ashino, Tokyo (JP); Takeo Ohno, Tokyo (JP)

(72) Inventors: Kentaro Sonoda, Tokyo (JP); Hideyuki Shimonishi, Tokyo (JP); Toshio Koide, Tokyo (JP); Yoichi Hatano, Tokyo (JP); Masayuki Nakae, Tokyo (JP); Masaya Yamagata, Tokyo (JP); Yoichiro Morita, Tokyo (JP); Takayuki Sasaki, Tokyo (JP); Yuki Ashino, Tokyo (JP); Takeo Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 14/389,309

(22) PCT Filed: Mar. 29, 2013

(86) PCT No.: PCT/JP2013/002183
§ 371 (c)(1),
(2) Date: Sep. 29, 2014

(87) PCT Pub. No.: WO2013/145780
PCT Pub. Date: Oct. 3, 2013

(65) Prior Publication Data
US 2015/0063354 A1    Mar. 5, 2015

(30) Foreign Application Priority Data

Mar. 30, 2012   (JP) ................................ 2012-080279

(51) Int. Cl.
*H04L 12/28* (2006.01)
*H04L 12/56* (2006.01)
(Continued)

(52) U.S. Cl.
CPC .......... *H04L 45/74* (2013.01); *G06F 9/45558* (2013.01); *H04L 45/02* (2013.01);
(Continued)

(58) Field of Classification Search
CPC ......... H04L 45/74; H04L 45/02; H04L 45/42; H04L 45/70; H04L 41/04
See application file for complete search history.

(56) References Cited

U.S. PATENT DOCUMENTS 8,560,663 B2 * 10/2013 Baucke ................... H04L 45/50
370/255
2011/0032830 A1 * 2/2011 Merwe .................. H04L 45/586
370/251
(Continued)

FOREIGN PATENT DOCUMENTS

JP    2011-70549 A    4/2011
JP    2011-081588 A   4/2011
(Continued)

OTHER PUBLICATIONS

International Search Report (ISR) (PCT Form PCT/ISA/210), in PCT/JP2013/002183, dated May 14, 2013.
(Continued)

*Primary Examiner* — Lonnie Sweet
(74) *Attorney, Agent, or Firm* — McGinn IP Law Group, PLLC.

(57) ABSTRACT

A communication system, includes: a node that requests a processing rule for processing a packet; and a control apparatus that notifies the node of the processing rule in response to the request. The control apparatus, upon being notified of change of a connection relationship between a communication apparatus to which a packet is addressed and the node, determines a forwarding path for a packet addressed to the communication apparatus and notifies the node of a processing rule for realizing the forwarding path.

12 Claims, 23 Drawing Sheets

(51) Int. Cl.
*H04L 12/741* (2013.01)
*H04L 12/717* (2013.01)
*H04L 12/751* (2013.01)
*H04L 12/721* (2013.01)
*G06F 9/455* (2018.01)
*H04L 12/24* (2006.01)

(52) U.S. Cl.
CPC .............. *H04L 45/42* (2013.01); *H04L 45/70* (2013.01); *G06F 2009/45595* (2013.01); *H04L 41/04* (2013.01)

(56) References Cited

U.S. PATENT DOCUMENTS

| | | |
|---|---|---|
| 2011/0261723 A1 | 10/2011 | Yamato et al. |
| 2011/0314517 A1 | 12/2011 | Yamato et al. |
| 2012/0131222 A1* | 5/2012 | Curtis ................ H04L 47/2441 709/235 |
| 2012/0185856 A1 | 7/2012 | Ashihara et al. |
| 2012/0195187 A1 | 8/2012 | Ashihara et al. |
| 2013/0166720 A1 | 6/2013 | Takashima et al. |
| 2013/0227097 A1 | 8/2013 | Yasuda et al. |

FOREIGN PATENT DOCUMENTS

| | | |
|---|---|---|
| JP | 2011-141635 A | 7/2011 |
| JP | 2012-065015 A | 3/2012 |
| WO | WO 2008/095010 A1 | 8/2008 |
| WO | WO 2011/037148 A1 | 3/2011 |
| WO | WO 2012/039176 A1 | 3/2012 |
| WO | WO 2012033117 A1 | 1/2018 |

OTHER PUBLICATIONS

Nick McKeown, and seven others, "OpenFlow: Enabling Innovation in Campus Networks," [online], [Searched on Oct. 31, 2011], Internet <URL:http://www.openflowswitch.org/documents/openflow-wp-latest.pdf>.
"OpenFlow Switch Specification, Version 1.1.0 Implemented (Wire Protocol 0x02)," [Searched on Oct. 31, 2011], Internet <URL:http://www.openflowswitch.org/documents/openflow-spec-v1.1.0.pdf>.
Extended European Search Report dated Oct. 14, 2015.
Japanese Office Action, dated Dec. 12, 2017, in Japanese Application No. 2017-021123 and English Translation thereof.
Yoichiro Morita, et al. "Plicy compostion and distribution methods for IT/NW integrated access control" SCIS 2012, pp. 2-7 (with English Abstract/Concise Statement of Relevance).

* cited by examiner

FIG. 7

(a) VIRTUAL MACHINE SPECIFICATION INFORMATION

| VIRTUAL MACHINE ID | USER ID | CPU CORE NUMBER | MEMORY AMOUNT |
|---|---|---|---|
| a | 0001 | 2 | 2GB |
| b | 0001 | 4 | 8GB |
| c | 0001 | 1 | 1GB |
| d | 0002 | 2 | 4GB |

(b) LOGICAL NETWORK INFORMATION

| VIRTUAL MACHINE ID | ASSIGNED NETWORK ID | FORWARDING NODE ID | PORT NUMBER |
|---|---|---|---|
| a | 100 | 210 | 1 |
| b | 100 | 210 | 2 |
| c | 100 | 240 | 1 |
| d | 200 | 240 | 2 |

FIG.10

| Match Fields | Instructions |
|---|---|
| SOURCE IP ADDRESS = IP ADDRESS OF USER TERMINAL 50; DESTINATION IP ADDRESS = IP ADDRESS OF VIRTUAL MACHINE 320; | FORWARDING THROUGH PORT #1 |
| SOURCE IP ADDRESS = IP ADDRESS OF VIRTUAL MACHINE 320; DESTINATION IP ADDRESS = IP ADDRESS OF USER TERMINAL 50; | FORWARDING THROUGH PORT #2 |
| ... | ... |

FIG.13

AUTHENTICATION INFORMATION

| USER ID | ROLE ID | ATTRIBUTE INFORMATION |
|---------|---------|-----------------------|
| 0001 | role_0001 | IP:192.168.100.1<br>MAC:00-00-00-44-55-66 |
| 0002 | role_0002 | IP:192.168.100.2<br>MAC:00-00-00-77-88-99 |
| ⋮ | ⋮ | ⋮ |

FIG. 15

COMMUNICATION POLICY

| ROLE ID | RESOURCE GROUP ID | ACCESS AUTHORITY |
|---|---|---|
| role_0001 | resource_group_0001 | allow |
| role_0001 | resource_group_0002 | allow |
| role_0002 | resource_group_0001 | deny |
| role_0002 | resource_group_0002 | allow |
| ... | ... | ... |

FIG.16
RESOURCE INFORMATION

| RESOURCE GROUP ID | RESOURCE ID | RESOURCE ATTRIBUTE |
|---|---|---|
| resource_group_0001 | resource_0001 | IP:192.168.0.1<br>MAC:00-00-00-11-22-33<br>SERVICE:80/tcp |
| | resource_0002 | IP:192.168.0.2 |
| | resource_0003 | IP:10.10.10.0/24 |
| resource_group_0002 | resource_0001 | IP:YYY.YYY.Y.Y |
| ⋮ | ⋮ | ⋮ |
| ⋮ | ⋮ | ⋮ |

FIG.17

ACCESS RULE

| SOURCE | DESTINATION | ACCESS AUTHORITY | CONDITION (OPTION) |
|---|---|---|---|
| 192.168.100.1 | 192.168.0.1 | allow | 80/tcp |
| 00-00-00-44-55-66 | 192.168.0.2 | allow | |
| 192.168.100.1 | IP:10.10.10.0/24 | allow | |
| 192.168.100.1 | 192.168.0.3 | deny | |
| ... | ... | ... | ... |

… # COMMUNICATION SYSTEM, CONTROL APPARATUS, COMMUNICATION APPARATUS, COMMUNICATION CONTROL METHOD, AND PROGRAM

REFERENCE TO RELATED APPLICATION

The present invention is based upon and claims the benefit of the priority of Japanese patent application No. 2012-080279, filed on Mar. 30, 2012, the disclosure of which is incorporated herein in its entirety by reference thereto.

FIELD

The present invention relates to a communication system, a control apparatus, a communication apparatus, a communication control method, and a program. In particular, it relates to a communication system, a control apparatus, a communication apparatus, a communication control method, and a program for setting a packet forwarding path in a network.

BACKGROUND

PTL (Patent Literature) 1, and NPL (Non-Patent Literature) 1, and NPL 2 disclose central-management-type path control methods using an OpenFlow technique. The OpenFlow technique disclosed in PTL 1 recognizes communications as end-to-end flows, performs path control on a per-flow basis, and executes load balancing and path optimization.

In PTL 1, NPL 1, and NPL 2, a switch serving as a forwarding node includes a secure channel communicating with a controller (control apparatus) that calculates packet paths. The switch operates in accordance with a flow table set by the controller. In the flow table, a combination of a matching rule which is matched against packet header information and an action describing a processing content applied to packets matching the matching rule is defined. For example, the action is a process of forwarding a packet to a certain interface.

When a switch disclosed in PTL 1, NPL 1, and NPL 2 receives a packet, the switch searches the flow table for an entry having a matching rule that matches header information of the received packet. As a result of the search, if the switch finds an entry matching the received packet, the switch executes a processing content described in the action field of the entry (for example, the switch forwards the received packet to a certain interface).

If the switch does not find an entry matching the packet as a result of the search, the switch requests the controller to set an entry for the received packet. In response to the request, the controller calculates a path for the received packet and notifies switches relating to the path of an entry realizing forwarding that uses the path. Notified of the entry, the switches update the flow tables and execute the processing contents described in the entries in the updated flow tables. Namely, the switches forward the respective received packets.

Patent Literature 1

International Publication No. 2008/095010

NPL Non Patent Literature 1

Nick McKeown, and seven others, "OpenFlow: Enabling Innovation in Campus Networks," [online], [Searched on Oct. 31, 2011], Internet <URL:http://www.openflowswitch.org/documents/openflow-wp-latest.pdf>

Non Patent Literature 1

"OpenFlow Switch Specification, Version 1.1.0 Implemented (Wire Protocol 0x02)," [Searched on Oct. 31, 2011], Internet <URL:http://www.openflowswitch.org/documents/openflow-spec-v1.1.0.pdf>

SUMMARY

The entire disclosures of the above Patent Literature PTL 1 and Non-Patent Literatures NPL 1 and NPL 2 are incorporated herein by reference thereto. The following analyses are given by the present invention. In the systems disclosed in PTL 1, NPL 1, and NPL 2, if the connection relationship between a communication apparatus to which a packet is addressed and a forwarding node is changed, a switch needs to forward packets addressed to the communication apparatus through a forwarding path based on the changed connection relationship. However, the switch does not have a processing rule for realizing such forwarding path based on the changed connection relationship. Thus, when the switch receives a packet addressed to the communication apparatus, the switch requests the control apparatus to set a processing rule for processing the received packet. In response to the request, the control apparatus calculates a forwarding path for the received packet, based on the changed connection relationship.

As described above, each time the connection relationship between a communication apparatus to which a packet is addressed and a forwarding node is changed, the control apparatus needs to receive a request for a processing rule from a switch. This is a cause of an increase of load on the control apparatus.

Therefore, there is a need in the art to suppress an increase of load on the control apparatus by reducing the number of requests for processing rules from switches.

According to a first aspect of the present invention, there is provided a communication system, comprising:
a node(s) that requests a processing rule for processing a packet; and
a control apparatus that notifies the node(s) of the processing rule in response to the request, wherein
the control apparatus, upon being notified of change of a connection relationship between a communication apparatus to which a packet is addressed and the node(s), determines a forwarding path for a packet addressed to the communication apparatus and notifies the node(s) of a processing rule for realizing the forwarding path.

According to a second aspect of the present invention, there is provided a control apparatus, comprising:
a first unit that generates a processing rule for processing a packet and transmitting the processing rule to a node(s); and
a second unit that, upon being notified of change of a connection relationship between a communication apparatus to which a packet is addressed and the node(s), determines a forwarding path for a packet addressed to the communication apparatus and notifies the node(s) of a processing rule for realizing the forwarding path.

According to a third aspect of the present invention, there is provided a communication control method, comprising:
by a control apparatus, generating a processing rule for processing a packet;
notifying a node(s) of the generated processing rule;

upon being notified of change of a connection relationship between a communication apparatus to which a packet is addressed and the node(s), determining a forwarding path for a packet addressed to the communication apparatus; and notifying the node(s) of a processing rule for realizing the forwarding path.

According to a fourth aspect of the present invention, there is provided a program, causing a control apparatus controlling a communication apparatus processing a packet, to execute:

generating a processing rule for processing a packet;
notifying a node(s) of the generated processing rule;
upon being notified of change of a connection relationship between a communication apparatus to which a packet is addressed and the node(s) is supplied, determining a forwarding path for a packet addressed to the communication apparatus; and
notifying the node(s) of a processing rule for realizing the forwarding path.

There is also provided a non-transitory computer-readable recording medium that stores the program.

The present invention provides the following advantage, but not restricted thereto. According to the present invention, load on a control apparatus that determines processing rules for processing packets addressed to communication apparatuses can be reduced.

BRIEF DESCRIPTION OF DRAWINGS

FIG. 7 illustrates virtual machine specification information and logical network information created by the virtual machine management apparatus according to the first exemplary embodiment.

FIG. 10 illustrates processing rules set in the forwarding node according to the first exemplary embodiment.

FIG. 13 illustrates authentication information according to the second exemplary embodiment.

FIG. 15 illustrates a communication policy according to the second exemplary embodiment.

FIG. 16 illustrates resource information according to the second exemplary embodiment.

FIG. 17 illustrates access rules according to the second exemplary embodiment.

PREFERRED MODES

Figure 1:
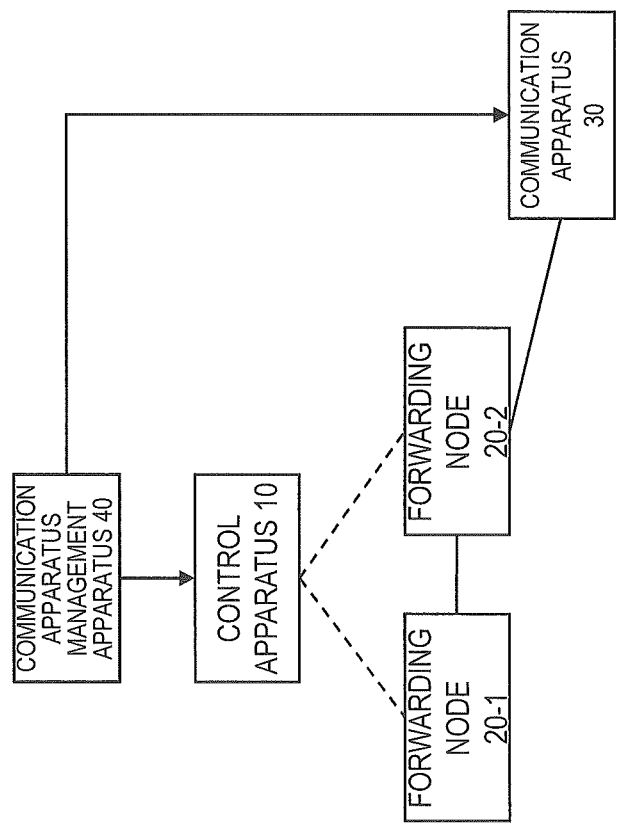
FIG. 1 illustrates a configuration of a communication system according to an exemplary embodiment.

In the present disclosure, there are various possible modes, which include the following, but not restricted thereto. First, an outline of an exemplary embodiment will be described with reference to the drawings. As illustrated in FIG. 1, a communication system according to an exemplary embodiment includes forwarding nodes 20-1 and 20-2 forwarding packets. In addition, the communication system includes a control apparatus 10 controlling packet forwarding paths in response to a request from at least one of the forwarding nodes 20-1 and 20-2. In addition, the communication system includes a communication apparatus 30 as a packet destination. In addition, the communication system includes a communication apparatus management apparatus 40 managing the connection relationship among the forwarding nodes 20-1 and 20-2 and the communication apparatus 30.

The control apparatus 10 controls packet forwarding paths in response to a request from at least one of a plurality of forwarding nodes 20-1 and 20-2.

As described above, the OpenFlow technique is one example of the central-management-type technique. The OpenFlow technique may be used to realize the present invention. Hereinafter, an exemplary embodiment in which the OpenFlow technique is applied to the present invention will be described. However, an arbitrary technique may be used to realize the present invention, as long as a control apparatus (path control apparatus) controls packet forwarding paths involving a plurality of nodes in a centralized manner. Namely, the present invention is not limited to the OpenFlow technique.

The communication apparatus 30 is an apparatus that can serve as a packet destination. For example, the communication apparatus 30 is a server, a mobile terminal, or a virtual server.

The communication apparatus management apparatus 40 is an apparatus managing the connection relationship among the forwarding nodes 20 and the communication apparatus 30. For example, the communication apparatus management apparatus 40 is an apparatus managing the connection relationship among the forwarding nodes 20 and a server. For example, the communication apparatus management apparatus 40 is an apparatus managing the connection relationship among the forwarding nodes 20 and a mobile terminal. For example, the communication apparatus management apparatus 40 is a virtual machine management apparatus creating a virtual forwarding node and a virtual machine in a virtual resource and manages the connection relationship among the created virtual forwarding node and the forwarding nodes 20.

To communicate with the control apparatus 10, each of the forwarding nodes 20-1 and 20-2 establishes a communication channel that ensures security with the control apparatus 10 (dotted lines in FIG. 1). Each of the forwarding nodes 20-1 and 20-2 processes an incoming packet in accordance with a processing rule (which will hereinafter be referred to as "a flow entry") suitably added or rewritten by the control apparatus 10.

Figure 2:
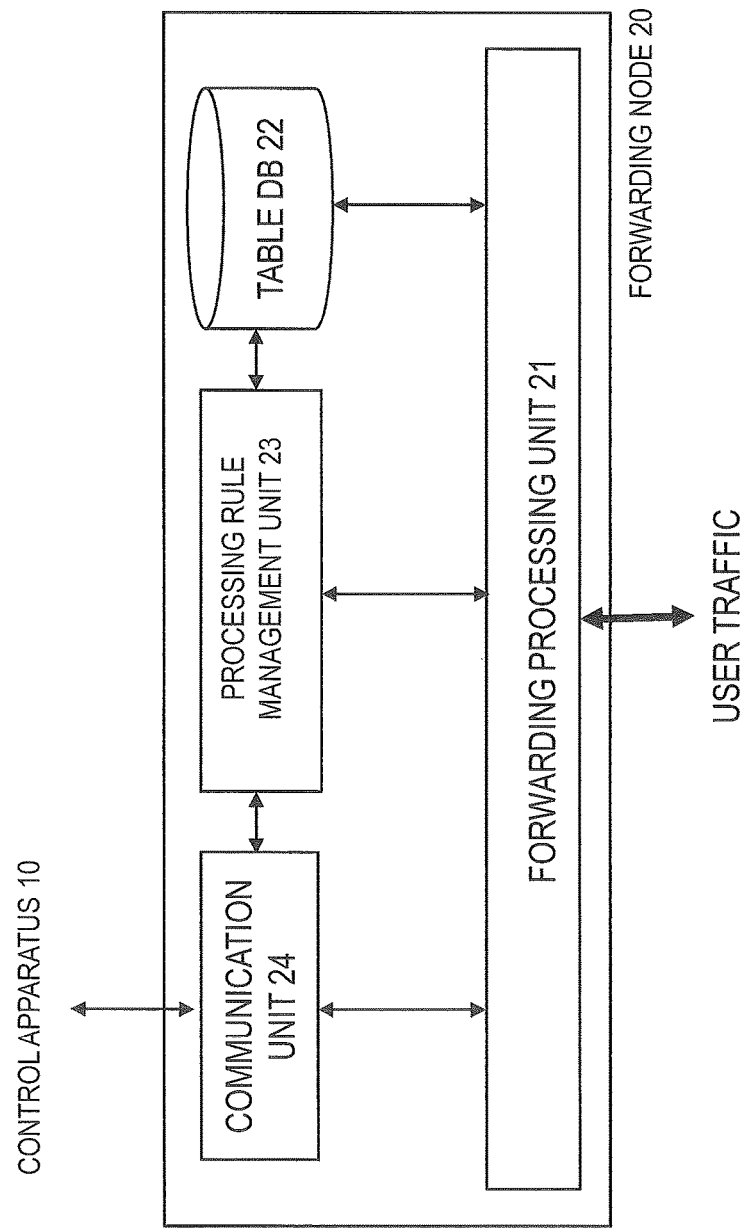
FIG. 2 illustrates a configuration of a communication node according to the exemplary embodiment.

A configuration of each of the forwarding nodes 20-1 and 20-2 is illustrated in FIG. 2.

FIG. 2 illustrates a configuration of each of the forwarding nodes 20 according to the present invention. Each forwarding node 20 includes a forwarding processing unit 21 processing an incoming packet in accordance with a processing rule matching the incoming packet. When receiving a packet, the forwarding processing unit 21 searches a table database (table DB) 22 for a processing rule 100 matching the incoming packet. If the forwarding processing unit 21 finds a processing rule 100 matching the incoming packet, the forwarding processing unit 21 processes the incoming packet in accordance with the instructions in the processing rule 100. In contrast, if the forwarding processing unit 21 does not find a processing rule matching the incoming packet, the forwarding processing unit 21 requests the control apparatus 10 to set a processing rule for processing the incoming packet. In the processing rule 100 matching the incoming packet, if a processing content indicating a query to the control apparatus 10 is defined, the forwarding processing unit 21 may query the control apparatus 10 in accordance with the processing rule.

For example, the forwarding processing unit 21 may be realized by using a mechanism equivalent to the OpenFlow switch in NPL 2.

Figure 3:
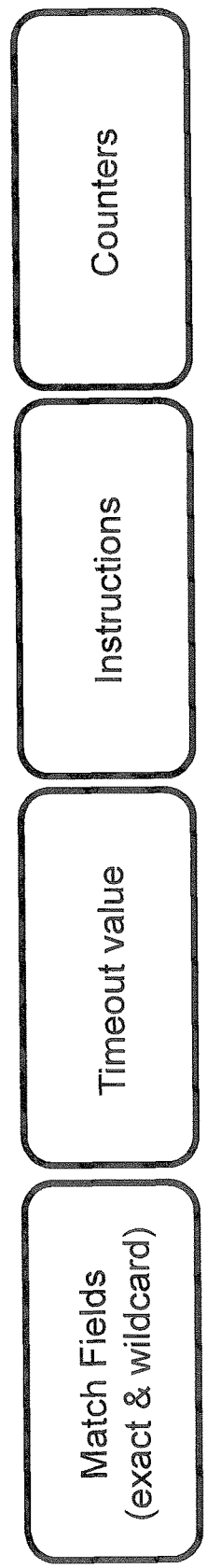
FIG. 3 illustrates a configuration of a processing rule according to the exemplary embodiment.

FIG. 3 illustrates a configuration of a processing rule 100 stored in the forwarding node 20 in FIG. 2. Since FIG. 3 is an example, the configuration of the processing rule 100 is not limited to the configuration illustrated in FIG. 3. As illustrated in FIG. 3, the processing rule 100 includes match fields. When a forwarding node 20 receives a packet, the forwarding node 20 refers to the match fields to search for a processing rule 100 matching the incoming packet. If the forwarding node 20 finds a processing rule 100 matching the incoming packet, the forwarding node 20 processes the packet in accordance with the instructions in the processing rule 100. In addition, based on the processing executed on the incoming packet, the forwarding node 20 updates statistical information (Counters) in the processing rule 100.

In contrast, if the forwarding node 20 does not find such processing rule 100 matching the incoming packet, the forwarding node 20 requests the control apparatus 10 to set a processing rule. Based on a processing rule in which a processing content requesting the control apparatus 10 to set a processing rule is defined, the forwarding node 20 may request the control apparatus 10 to set a processing rule.

Each forwarding node 20 includes the table DB 22 storing processing rules. For example, the table DB 22 is configured by a database capable of storing at least one table to which the forwarding processing unit 21 refers when processing an incoming packet.

Each forwarding node 20 includes a processing rule management unit 23 managing processing rules.

A communication unit 24 is a means of realizing communication with the control apparatus 10 setting a processing rule in the forwarding node 20.

Figure 4:
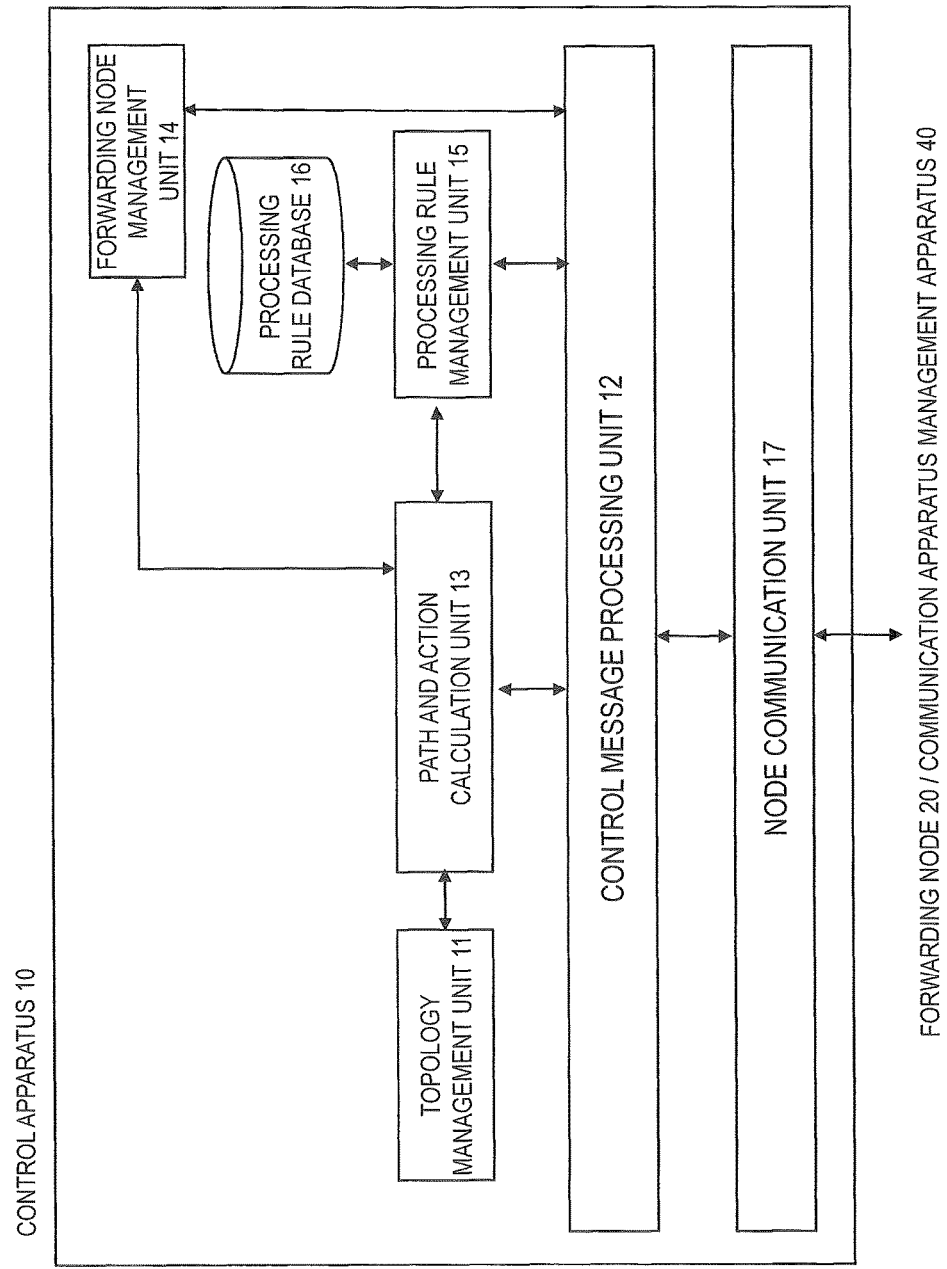
FIG. 4 illustrates a configuration of a control apparatus according to the exemplary embodiment.

FIG. 4 illustrates a configuration of the control apparatus 10 in FIG. 1. The control apparatus 10 includes a topology management unit 11, a control message processing unit 12, a path and action calculation unit 13, a forwarding node management unit 14, a processing rule management unit 15, a processing rule database 16, and a node communication unit 17.

The topology management unit 11 establishes network topology information, based on the connection relationship between the forwarding nodes 20-1 and 20-2 collected via the node communication unit 17. If the topology information is changed, the topology management unit 11 notifies the path and action calculation unit 13 of change of the topology information, to cause the path and action calculation unit 13 to reset existing processing rules, for example.

The control message processing unit 12 analyzes a control message received from at least one of the forwarding nodes 20 and transmits information about the control message to relevant processing means in the control apparatus 10.

The path and action calculation unit 13 includes a means of calculating a packet forwarding path based on the topology information managed by the topology management unit 11. In addition, the path and action calculation unit 12 serves as a means of referring to information about each forwarding node 20 managed by the forwarding node management unit 14 (for example, capability information about each forwarding node 20) and determining a processing content (action) to be executed by each forwarding node 20. Examples of the capability information about each forwarding node 20 include the number of ports of each forwarding node, the types of the ports, and the types of the actions supported. The capability information is not limited to the above information. Namely, arbitrary information may be used as the capability information.

According to an exemplary embodiment, the communication apparatus management apparatus 40 notifies the path and action calculation unit 13 of change of the connection relationship among the communication apparatus 30 and the forwarding nodes 20-1, 20-2. Based on the notification from the communication apparatus management apparatus 40, the path and action calculation unit 13 determines a forwarding path for a packet addressed to the communication apparatus 30. The path and action calculation unit 13 previously notifies at least one of the forwarding nodes 20-1 and 20-2 of a processing rule for realizing the determined forwarding path.

The forwarding node management unit 14 manages capabilities of each forwarding node 20 managed thereby (for example, the number of ports, the types of the ports, and the types of the actions supported).

The processing rule management unit 15 manages the processing rules set in the forwarding nodes 20. The processing rule management unit 15 stores results calculated by the path and action calculation unit 13 in the processing rule database 16 as processing rules. In addition, for example, if a forwarding node 20 notifies the control apparatus 10 of deletion of a processing rule, that is, change of the processing rules set in the forwarding node 20, the processing rule management unit 15 updates the content of the processing rule database 16.

The processing rule database 16 stores at least one processing rule.

The node communication unit 17 communicates with each forwarding node 20. In the present exemplary embodiment, the node communication unit 17 uses the OpenFlow protocol in NPL 2 to communicate with each forwarding node 20. However, the communication protocol used between the node communication unit 17 and each forwarding node 20 is not limited to the OpenFlow protocol.

With the above configuration, if the connection relationship among the communication apparatus serving as a packet destination and the forwarding nodes is changed, the control apparatus previously notifies a forwarding node (switch) of a processing rule for processing packets addressed to the communication apparatus. When the forwarding node (switch) receives a packet addressed to the communication apparatus, since a processing rule has already been set, the forwarding node (switch) does not request the control apparatus to set a processing rule. Thus, according to an exemplary embodiment, since the number of requests for processing rules from switches is reduced, load on the control apparatus can be reduced.

First Exemplary Embodiment

Figure 5:
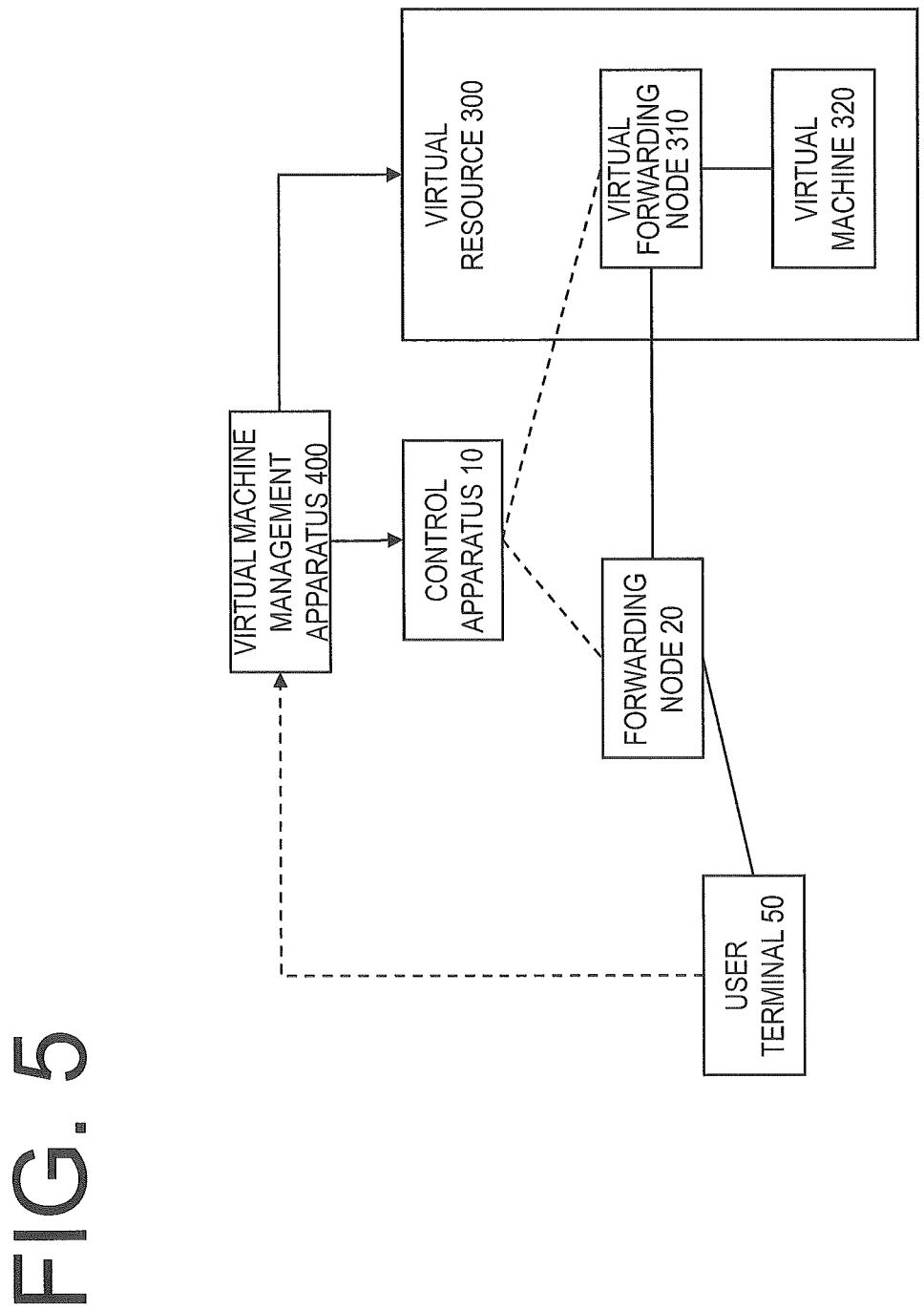
FIG. 5 illustrates a configuration of a communication system according to a first exemplary embodiment.

A first exemplary embodiment will be described with reference to the drawings. FIG. 5 illustrates a configuration of a system according to a first exemplary embodiment. As illustrated in FIG. 5, the system according to the first exemplary embodiment includes a control apparatus 10, a forwarding node 20, a virtual resource 300, a virtual machine management apparatus 400, and a user terminal 50. The system may include a plurality of forwarding nodes 20. The control apparatus 10 and the virtual machine management apparatus 400 may operate as separate apparatuses as illustrated in FIG. 5 or may operate as a single apparatus.

The virtual machine management apparatus 400 receives a request from the user terminal 50 such as for creation or change of a setting of a virtual machine. Based on the request, the virtual machine management apparatus 400 creates a virtual machine in an arbitrary resource.

Figure 6:
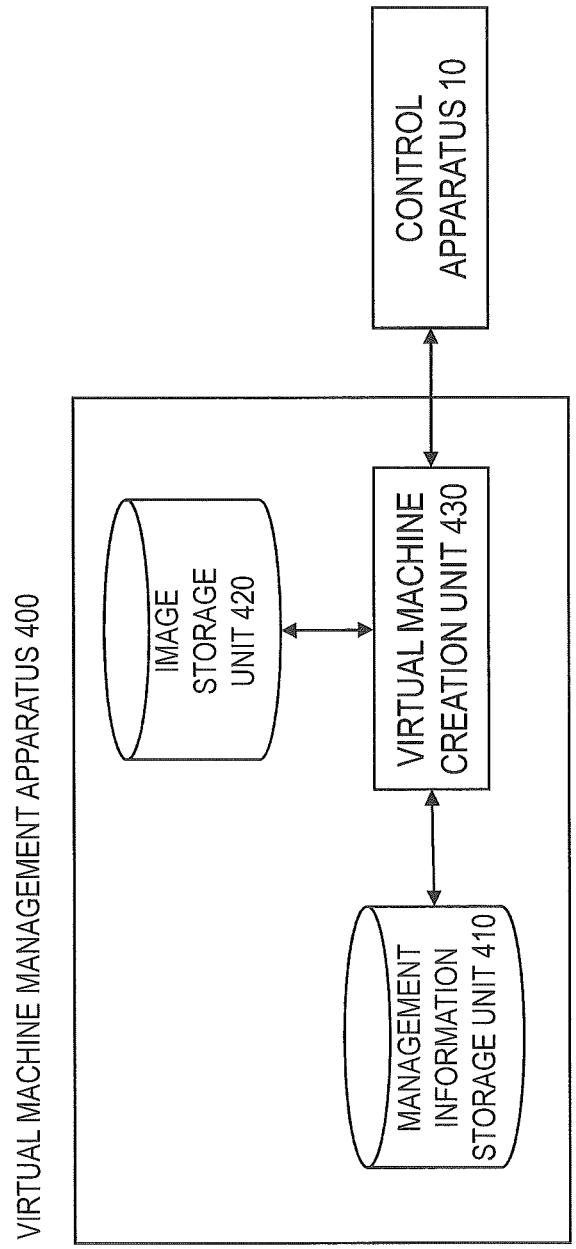
FIG. 6 illustrates a configuration of a virtual machine management apparatus according to the first exemplary embodiment.

FIG. 6 illustrates a configuration of the virtual machine management apparatus 400 illustrated in FIG. 5.

As illustrated in FIG. 6, the virtual machine management apparatus 400 includes a management information storage unit 410, an image storage unit 420, and a virtual machine creation unit 430.

The management information storage unit 410 includes a means of receiving a request for creation of a virtual machine from the user terminal 50 and storing the request. Based on the request received from the user terminal 50, the management information storage unit 410 creates information about a logically-configured logical network. Based on the request received from the user terminal 50, the management information storage unit 410 transmits the created logical network information to the virtual machine creation unit 430.

FIGS. 7(a) and 7(b) illustrate configurations of management information stored in the management information storage unit 410. As illustrated in FIGS. 7(a) and 7(b), the management information storage unit 410 stores the management information as tables.

FIG. 7(a) illustrates requests received from the user terminal 50. For example, the requests received from the user terminal 50 are stored as virtual machine specification information. As illustrated in FIG. 7(a), the virtual machine specification information represents specifications of virtual machines requested by the user terminal 50. For example, in the virtual machine specification information, the number of CPU (Central Processing Unit) cores and a memory amount requested by a user are associated with a virtual machine ID (Identification) and a user ID. For example, information described in the second row in the table in FIG. 7(a) signifies that "a user having a user ID 0001 requests creation of a virtual machine whose virtual machine ID is a, CPU core number is 2, and memory amount is 2 GB. Various types of specification information other than the CPU core number and memory amount, such as a storage amount and an OS (Operating System), may be used in the virtual machine specification information.

FIG. 7(b) illustrates information about logical networks created based on requests received from the user terminal 50. For example, the management information storage unit 410 stores logical network information created based on the virtual machine specification information. When determining a resource in which a virtual machine is to be created, the virtual machine management apparatus 400 selects a resource having a minimum number of operating virtual machines or selects a resource having a minimum CPU utilization rate, for example. The method of determining a resource in which a virtual machine is to be created is not limited to these methods. An arbitrary method may be used to determine such resource.

As illustrated in FIG. 7(b), in the logical network information, the ID of a virtual machine is associated with the ID of an assigned network to which the virtual machine belongs. The assigned network ID is information used to distinguish a plurality of logical networks from each other. The same network ID is assigned to the virtual machines belonging to the same logical network. The virtual machines having the same assigned network ID can communicate with each other. In contrast, since the virtual machines having different assigned network IDs belong to different logical networks, these virtual machines cannot communicate with each other.

In the logical network information, the ID of a virtual machine is associated with the ID and the port number of a virtual forwarding node connected to the virtual machine. The information described in the second row in the table in FIG. 7(b) signifies that "the virtual machine having virtual machine ID a belongs to network ID 100, is connected to a forwarding node whose ID is 210 and whose port number is 1."

The image storage unit 420 previously stores image files that are used when the virtual machine creation unit 430 creates virtual machines. These image files are duplicated data having a file or directory structure. The user terminal 50 may store image files used thereby. The image storage unit 420 notifies the virtual machine creation unit 430 of these image files.

The virtual machine creation unit 430 receives the virtual machine specification information and the logical network information from the management information storage unit 410 and the image files from the image storage unit 420 and creates virtual machines. Creation of a virtual machine can be realized by an arbitrary type of virtual machine creation software such as KVM (Kernel-Based Virtual Machine). A virtual machine is created based on the virtual machine specification information and is arranged in a resource having a forwarding node ID and a port number in the logical network information. After creating a virtual machine, the virtual machine creation unit 430 notifies the control apparatus 10 of the logical network information.

A virtual forwarding node 310 and a virtual machine 320 created by the virtual machine management unit 400 are arranged in the virtual resource 300. A plurality of virtual forwarding nodes 310 and virtual machines 320 may be arranged in the virtual resource 300. The virtual forwarding node 310 is a forwarding node, such as an OpenvSwitch, realized by software. While a network is realized by a combination of a forwarding node and a virtual forwarding node, in the first exemplary embodiment, a network may be realized by forwarding nodes alone or virtual forwarding nodes alone.

Figure 8:
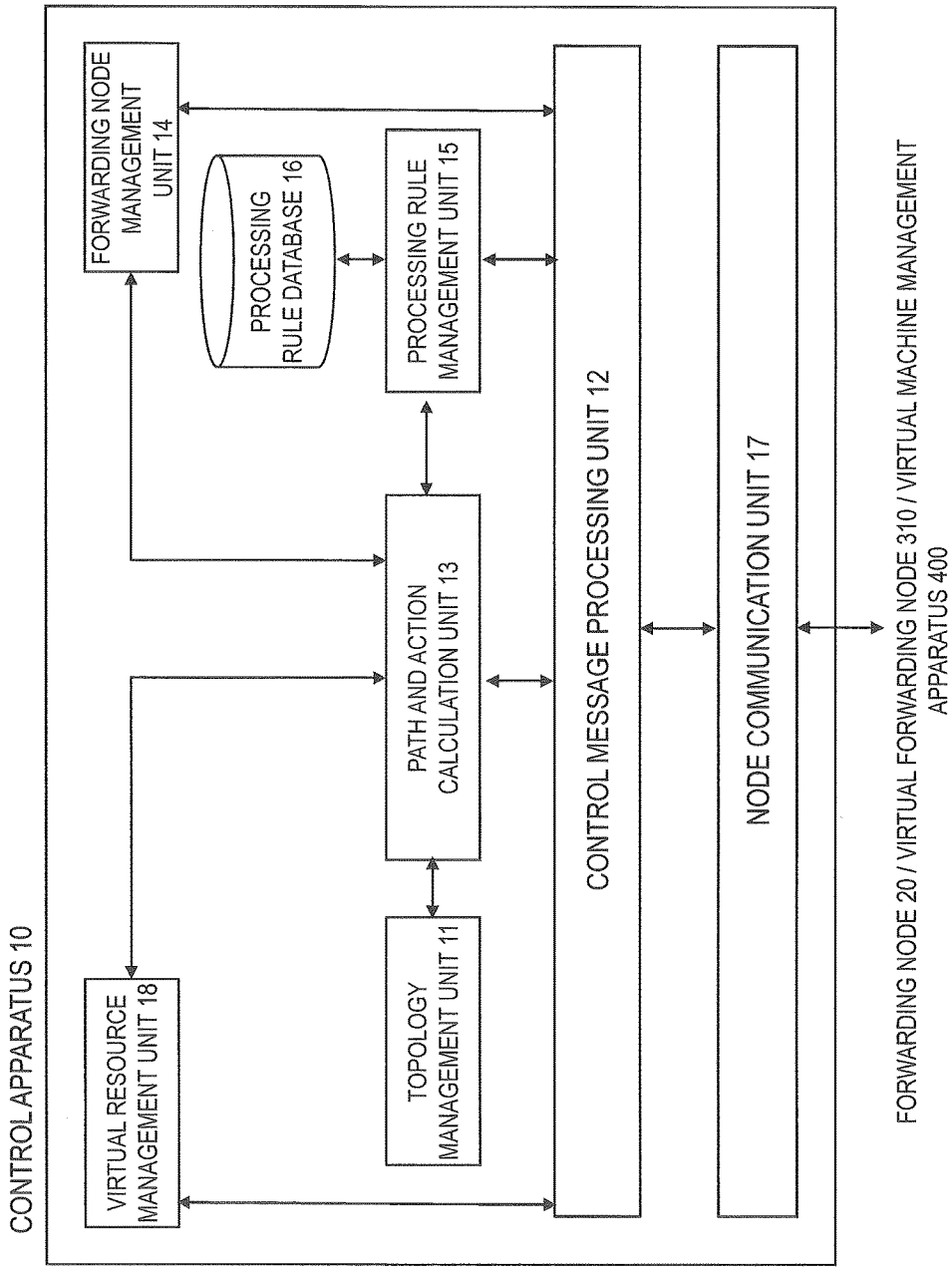
FIG. 8 illustrates a configuration of a control apparatus according to the first exemplary embodiment.

FIG. 8 illustrates a configuration of the control apparatus 10 in FIG. 5. The control apparatus 10 receives the logical network information from the virtual machine management apparatus 400, generates a processing rule for controlling packet communication, and sets the processing rule in the forwarding node 20 and the virtual forwarding node 310. When receiving a processing rule setting request, the control apparatus 10 creates a packet forwarding path and a processing rule for realizing the forwarding path, based on the packet information included in the processing rule setting request. The control apparatus 10 sets the created processing rule in the forwarding node 20 and the virtual forwarding node 310 on the forwarding path.

The control apparatus 10 includes a topology management unit 11, a control message processing unit 12, a path and action calculation unit 13, a forwarding node management unit 14, a processing rule management unit 15, a processing rule database 16, a node communication unit 17, and a virtual resource management unit 18.

The topology management unit 11 establishes network topology information, based on information about the forwarding node 20 collected via the node communication unit 17. If the topology information is changed, the topology management unit 11 notifies the path and action calculation unit 13 of change of the topology information, to cause the path and action calculation unit 13 to reset an existing processing rule, for example. The topology management unit 11 may establish the network topology information, not only on the basis of the information about the forwarding node 20 but also on the basis of information about the virtual forwarding node 310. In this case, the virtual machine management apparatus 400 notifies the topology management unit 11 of the information about the virtual forwarding node 310. Alternatively, the topology management unit 11 may collect the information via the node communication unit 17.

The control message processing unit 12 analyzes a control message received from at least one forwarding node 20 and transmits information about the control message to relevant processing means in the control apparatus 10.

The path and action calculation unit 13 includes a means of calculating a packet forwarding path based on the topology information managed by the topology management unit 11 and the logical network information supplied from the virtual machine management apparatus 400. In addition, the path and action calculation unit 13 serves as a means of referring to information about the forwarding node 20 managed by the forwarding node management unit 14 (for example, capability information about each forwarding node 20) and information about the virtual forwarding node 310 included in the logical network information and determining a processing content (action) to be executed by the forwarding node 20 and the virtual forwarding node 310.

In the exemplary embodiment, the virtual machine management apparatus 400 notifies the path and action calculation unit 13 of the logical network information. When notified of the logical network information, the path and action calculation unit 13 determines a forwarding path for packets addressed to the virtual machine 320, based on the information about the forwarding node 20 stored in the topology management unit 11 and the information about the virtual forwarding node 310 included in the supplied logical network information. The path and action calculation unit 13 grasps that the forwarding node 20 is connected to the virtual forwarding node 310, based on the capability information about the forwarding node 20 stored in the topology management unit 11 (for example, the number of ports, the types of the ports, the types of the actions supported, etc.). In addition, the path and action calculation unit 13 grasps that the virtual forwarding node 310 is connected to the virtual machine 320 as a packet destination, based on capabilities of the virtual forwarding node 310 included in the logical network information (for example, the number of ports, the types of the ports, the types of the actions supported, etc.).

Based on the grasped information, the path and action calculation unit 13 calculates a packet forwarding path from the user terminal 50 to the virtual machine 320 and previously notifies the forwarding node 20 and the virtual forwarding node 310 of a processing rule for realizing the calculated forwarding path.

The forwarding node management unit 14 manages capabilities of the forwarding node 20 managed thereby (for example, the number of ports, the types of the ports, the types of the actions supported, etc.).

The virtual resource management unit 18 stores the logical network information supplied from the virtual machine management apparatus 400 and manages capabilities of the virtual forwarding node 310 managed thereby (for example, the number of ports, the types of the ports, the types of the actions supported, etc.).

The processing rule management unit 15 manages processing rules set in the forwarding node 20. The processing rule management unit 15 stores results calculated by the path and action calculation unit 13 in the processing rule database 16 as processing rules. In addition, if the forwarding node 20 notifies the control apparatus 10 of deletion of a processing rule and change of the processing rules set in the forwarding node 20, the processing rule management unit 15 updates the content of the processing rule database 16.

The processing rule database 16 stores at least one processing rule.

The node communication unit 17 communicates with the forwarding node 20 and the virtual forwarding node 310. In the present exemplary embodiment, the node communication unit 17 uses the OpenFlow protocol in PTL 1 to communicate with the forwarding node 20 and the virtual forwarding node 310. However, the communication protocol used among the node communication unit 17, the forwarding node 20, and the virtual forwarding node 310 is not limited to the OpenFlow protocol.

The above units (processing means) of the control apparatus 10 can be realized by using hardware of a computer constituting the control apparatus 10, storing the above information, and causing a computer program to execute the above processing.

Figure 9:
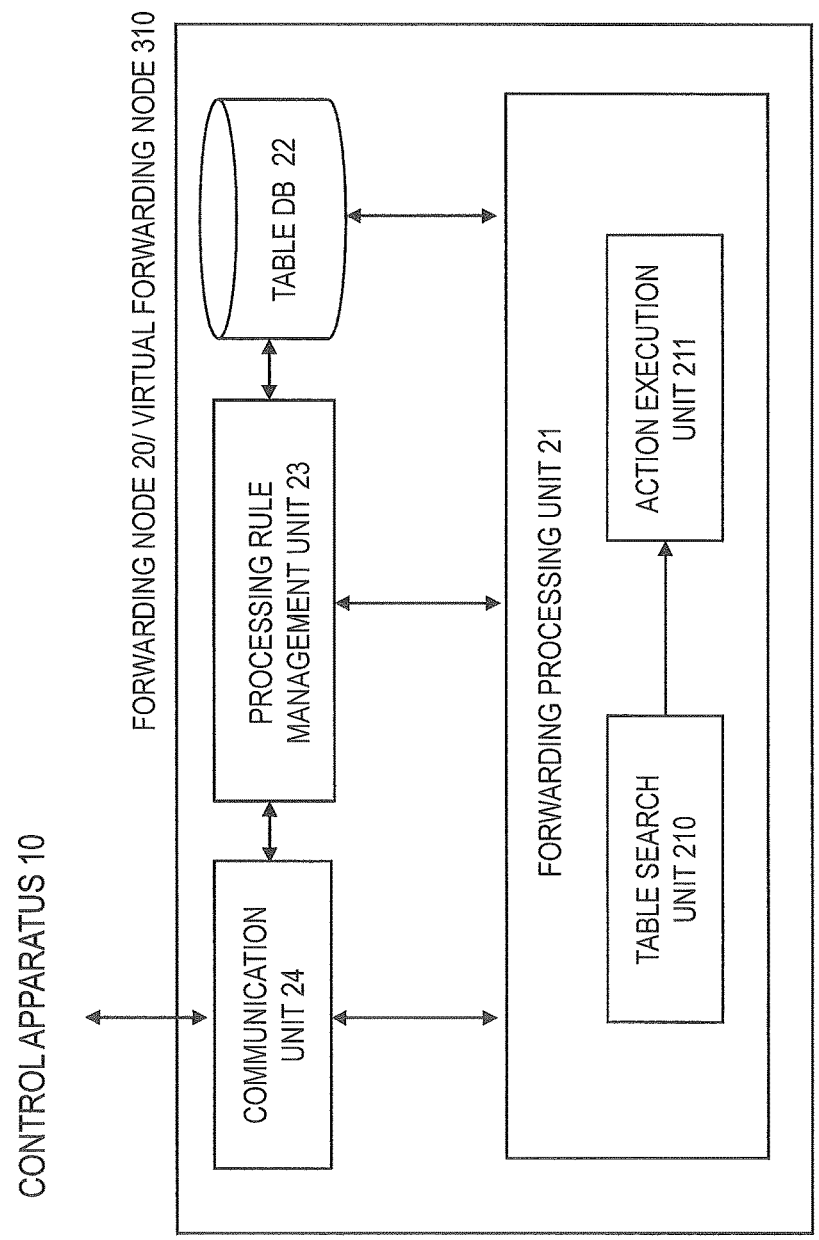
FIG. 9 illustrates a configuration of a forwarding node and a virtual forwarding node according to the first exemplary embodiment.

FIG. 9 illustrates a configuration of the forwarding node 20 and the virtual forwarding node 310 in FIG. 5. The virtual forwarding node 310 and the forwarding node 20 have the same configuration. The OpenFlow switch in NPL 2 operating with the flow entry illustrated in FIG. 3 as a processing rule can be used as each of the forwarding node 20 and the virtual forwarding node 310.

The forwarding node 20 and the virtual forwarding node 310 include a forwarding processing unit 21, a table database (table DB) 22, a processing rule management unit 23, and a communication unit 24.

The forwarding processing unit 21 includes a table search unit 210 and an action execution unit 211, as illustrated in FIG. 9. The table search unit 210 searches a table stored in the table DB 22 for a processing rule having a match field matching an incoming packet. The action execution unit 211 executes packet processing, in accordance with a processing content indicated in the instruction field of the processing rule found by the table search unit 210.

If the table search unit 210 does not find a processing rule having a match field matching the incoming packet, the forwarding processing unit 21 notifies to that effect to the processing rule management unit 23. If a query to the control apparatus 10 is defined as a packet processing method in a processing rule having a match field matching the incoming packet, the forwarding processing unit 21 may notify to that effect to the processing rule management unit 23. When notified by the forwarding processing unit 21, the processing rule management unit 23 transmits a query to the control apparatus 10 via the communication unit 24.

Depending on the packet processing, the forwarding processing unit 21 updates the statistical information (Counters) in the processing rule registered in the table DB 22. The forwarding processing unit 21 may determine a statistical value from statistical information (Counters) corresponding to each of a plurality of processing rules. For example, the forwarding processing unit 21 adds statistical information corresponding to each of a plurality of processing rules to calculate a statistical value. The processing rule management unit 23 compares this statistical value with each processing rule expiration condition to determine whether each processing rule is valid. Alternatively, for example, the forwarding processing unit 21 calculates a statistical value from the statistical information corresponding to a processing rule corresponding to a predetermined condition, among the processing rules stored in the table DB 22. Alternatively, for example, the forwarding processing unit 21 calculates a statistical value from the statistical information corresponding to a processing rule for processing packets inputted through a predetermined port or a processing rule for outputting packets to a predetermined port.

For example, the table DB 22 is configured by a database capable of storing at least one table to which the forwarding processing unit 21 refers when processing an incoming packet.

FIG. 10 illustrates a table set in the table DB 22 of the forwarding node 20. In FIG. 10, processing rules for realizing communication between the user terminal 50 and the virtual machine 320 in FIG. 5 are set. For example, the IP address of the user terminal 50 is set as the source IP address and the IP address of the virtual machine 320 is set as the destination IP address in a header field of a packet addressed from the user terminal 50 to the virtual machine 320. Thus, when the forwarding node 20 receives a packet addressed to the virtual machine 320 from the user terminal 50, the table search unit 210 of the forwarding node 20 finds the top processing rule in the table in FIG. 10 as a processing rule matching the incoming packet. Next, in accordance with the contents of the instruction fields, the action execution units 211 of the forwarding node 20 and the virtual forwarding node 310 forward the incoming packet through the port (#1) connected to the forwarding node 20 and the virtual forwarding node 310. For example, if no processing rule corresponding to the incoming packet exists or if the "Instructions" defined in the processing rule indicate a query to the control apparatus 10, the forwarding node 20 and the virtual forwarding node 310 request the control apparatus 10 to set a processing rule.

Likewise, for example, in a header field of a packet addressed from the virtual machine 320 to the user terminal 50, the IP address of the virtual machine 320 is set as the source IP address and the IP address of the user terminal 50 is set as the destination IP address. Thus, when the forwarding node 20 receives a packet addressed from the virtual machine 320 to the user terminal 50, the table search unit 210 of the forwarding node 20 finds the second top processing rule in the table in FIG. 10 as a processing rule matching the incoming packet. Next, in accordance with the contents of the instruction fields, the action execution units 211 of the forwarding node 20 and the virtual forwarding node 310 forward the incoming packet through the port (#2) connected to the user terminal 50. For example, if no processing rule corresponding to the incoming packet exists or if the "Instructions" defined in the processing rule indicate a query to the control apparatus 10, the forwarding node 20 and the virtual forwarding node 310 request the control apparatus 10 to set a processing rule.

The processing rule management unit 23 is a means of managing the table in the table DB 22. More specifically, the processing rule management unit 23 registers processing rules specified by the control apparatus 10 in the table DB 22. In addition, when notified by the forwarding processing unit 21 of reception of a new packet, the processing rule management unit 23 requests the control apparatus 10 to set a processing rule for processing the incoming packet.

The communication unit 24 is a means of realizing communication with the control apparatus 10 setting a processing rule in the forwarding node 20 and the virtual forwarding node 310. In the first exemplary embodiment, the communication unit 24 uses the OpenFlow protocol in NPL 2 to communicate with the control apparatus 10. However, the communication protocol used between the communication unit 24 and the control apparatus 10 is not limited to the OpenFlow protocol.

Figure 11:
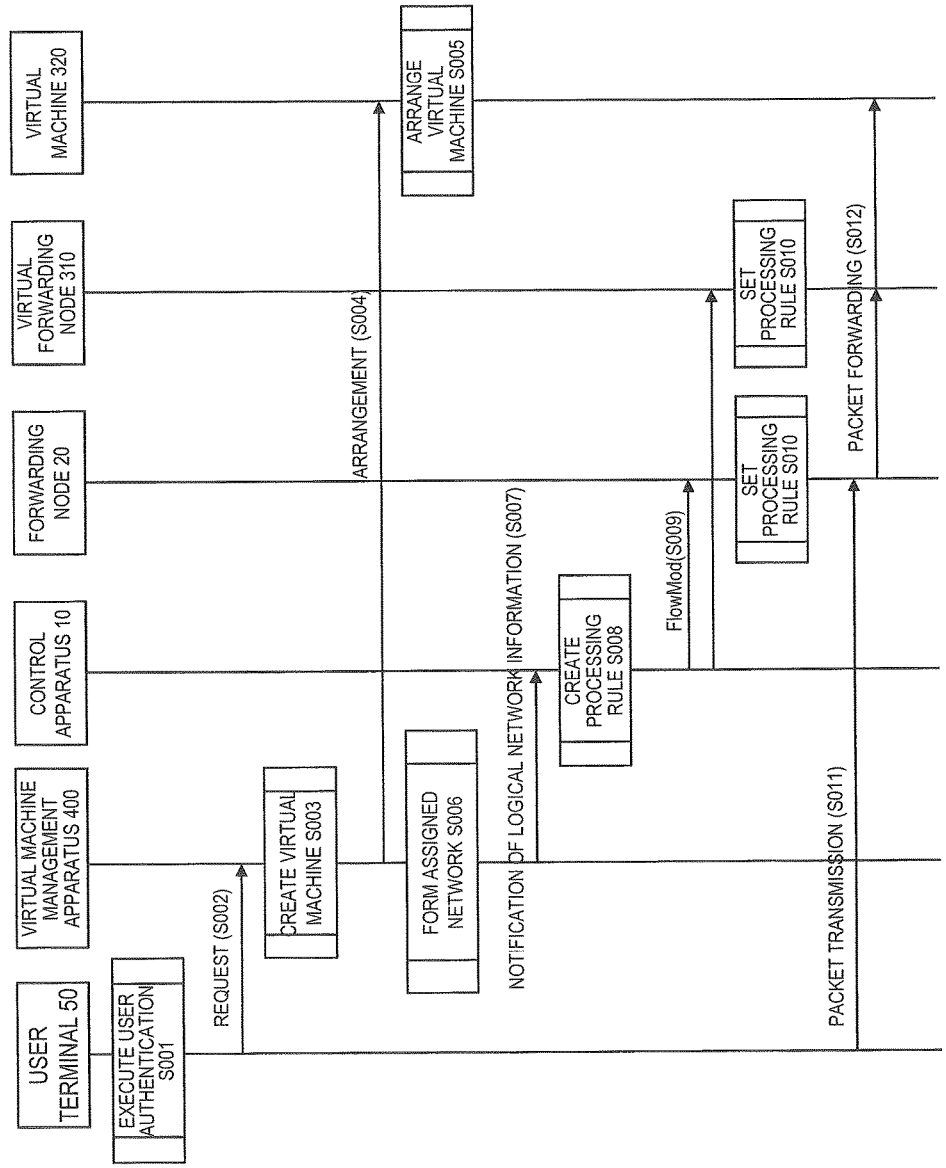
FIG. 11 is a sequence diagram illustrating an operation of the communication system according to the first exemplary embodiment.

FIG. 11 is a sequence diagram illustrating an operation of the communication system according to the first exemplary embodiment.

The user terminal 50 authenticates a user (step S001 in FIG. 11). The user authentication is executed to uniquely identify a user. The user terminal 50 may use a user ID and a password to authenticate a user. Alternatively, the user terminal 50 may use the MAC (Media Access Control) address of a user terminal used by a user. Namely, an arbitrary method may be used to authenticate a user. For the user authentication, a dedicated authentication apparatus (not illustrated) executing authentication processing may be used. Alternatively, the virtual machine management apparatus 400 may execute authentication processing.

Next, the user terminal 50 requests the virtual machine management apparatus 400 to create a virtual machine (step S002 in FIG. 11).

In accordance with the request from the user terminal 50, the virtual machine management apparatus 400 creates a virtual machine 320 (step S003 in FIG. 11) and arranges the virtual machine 320 in a specified virtual resource 300 (step S004 in FIG. 11). The virtual machine 320 is arranged in the virtual resource 300 (step S005 in FIG. 11). The virtual machine management apparatus 400 forms a network that the created virtual machine 320 belongs to (step S006 in FIG. 11).

The virtual machine management apparatus 400 checks the user ID used for the user authentication with the user IDs in the virtual machine specification information stored in the management information storage unit 410. If the virtual machine specification information includes the user ID, the virtual machine management apparatus 400 notifies the control apparatus 10 of the logical network information (step S007 in FIG. 11).

If the virtual machine specification information does not include the user ID, the virtual machine management apparatus 400 registers a new assigned network ID for the user ID in the logical network information and notifies the control apparatus 10 of the logical network information in which the assigned network ID has been registered (step S007 in FIG. 11).

The control apparatus 10 receives information about the assigned network of the virtual machine from the virtual machine management apparatus 400 and creates a processing rule in accordance with the assigned network information (step S008 in FIG. 11).

The control apparatus 10 notifies the forwarding node 20 and the virtual forwarding node 310 of the created processing rule (FlowMod in step S009 in FIG. 11).

The forwarding node 20 and the virtual forwarding node 310 receive the processing rule from the control apparatus 10 and set the processing rule (step S010 in FIG. 11).

The virtual machine management apparatus 400 may create a virtual machine first or notifies the control apparatus 10 of the logical network information first. Alternatively, these steps may be executed simultaneously.

The user terminal 50 transmits a packet addressed to the virtual machine 320 (step S011 in FIG. 11).

The packet transmitted from the user terminal 50 is sequentially forwarded to the forwarding node 20 and the virtual forwarding node 310. The forwarding node 20 and the virtual forwarding node 310 determine packet forwarding in accordance with the processing rule set by the control apparatus 10 and forward the packet (step S012 in FIG. 11).

In the first exemplary embodiment, if the virtual machine management apparatus 400 notifies the control apparatus 10 of information about the connection relationship between the virtual machine 320 and the virtual forwarding node 310, the control apparatus 10 previously notifies the forwarding node 20 and the virtual forwarding node 310 of a processing rule for processing packets addressed to the virtual machine 320. If the forwarding node 20 or the virtual forwarding node 310 receives a packet addressed to the virtual machine 320, since the processing rule has already been set, the forwarding node 20 or the virtual forwarding node 310 does not request the control apparatus 10 for a processing rule. Thus, according to the first exemplary embodiment, since the number of requests for processing rules from the forwarding node 20 or the virtual forwarding node 310 is reduced, load on the control apparatus can be reduced.

Second Exemplary Embodiment

A second exemplary embodiment will be described with reference to the drawings. An authentication apparatus 60 and a communication policy management apparatus 70 are included in a communication system according to the second exemplary embodiment.

In the second exemplary embodiment, the authentication apparatus 60 authenticates the user terminal 50. The communication policy management apparatus 70 determines an access rule indicating access authorization of the virtual machine 320 created by the user terminal 50 with respect to other virtual machines.

In the second exemplary embodiment, the user terminal 50 transmits an instruction for change of an access rule to the policy management apparatus 70. Based on the instruction for change of an access rule, the communication policy management apparatus 70 determines a new access rule. Based on the new access rule, the control apparatus 10 resets the forwarding path from the user terminal 50 to the virtual machine 320. The control apparatus 10 previously sets a processing rule for realizing the reset forwarding path in the forwarding node 20 and the virtual forwarding node 310.

Thus, in the second exemplary embodiment, since the communication policy management apparatus 70 is arranged, the communication policy management apparatus 70 can receive an instruction for change of an access rule from the user terminal 50 and previously set a processing rule based on the change instruction in the forwarding node 20 and the virtual forwarding node 310.

Figure 12:
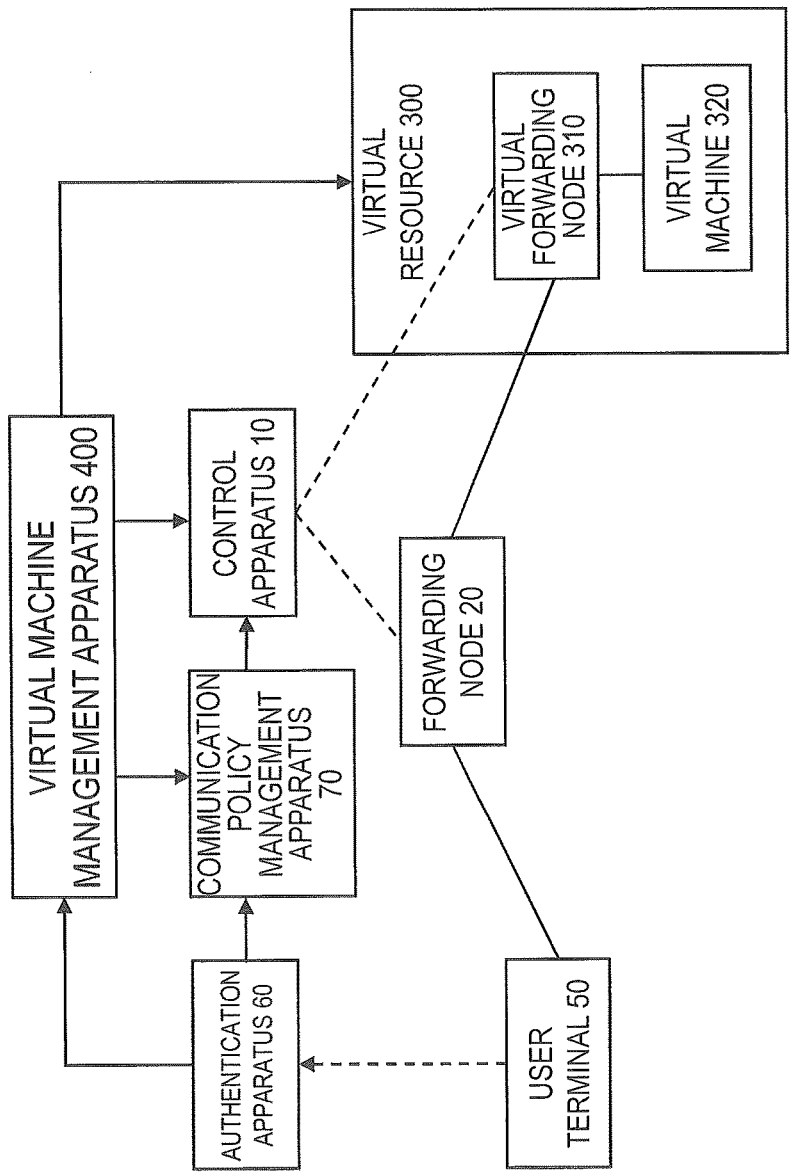
FIG. 12 illustrates a configuration of a communication system according to a second exemplary embodiment.

FIG. 12 illustrates a configuration of the communication system according to the second exemplary embodiment. As illustrated in FIG. 12, the second exemplary embodiment is different from the first exemplary embodiment in that the communication system according to the second exemplary embodiment includes the authentication apparatus 60 and the communication policy management apparatus 70. Since other elements are the same between the first and second exemplary embodiments, the second exemplary embodiment will hereinafter be described with a focus on the difference.

The authentication apparatus 60 is an apparatus for authenticating the user terminal 50. For example, in response to a request from the user terminal 50, the authentication apparatus 60 authenticates the user terminal 50. The user terminal 50 transmits an instruction for change of an access rule by requesting the authentication apparatus 60.

While the user terminal 50 transmits an instruction for change of an access rule via the authentication apparatus 60 in the second exemplary embodiment, the user terminal 50 may directly give an instruction for change of an access rule to the communication policy management apparatus 70.

FIG. 13 illustrates authentication information transmitted to the communication policy management apparatus 70 when the authentication apparatus 60 succeeds in authentication of the user terminal 50. For example, when succeeding in authentication of the user terminal 50, the authentication apparatus 60 notifies the communication policy management apparatus 70 of authentication information in which a user ID, a role ID, and attribute information are associated with each other.

The user ID is an identifier for identifying the user terminal 50.

Figure 14:
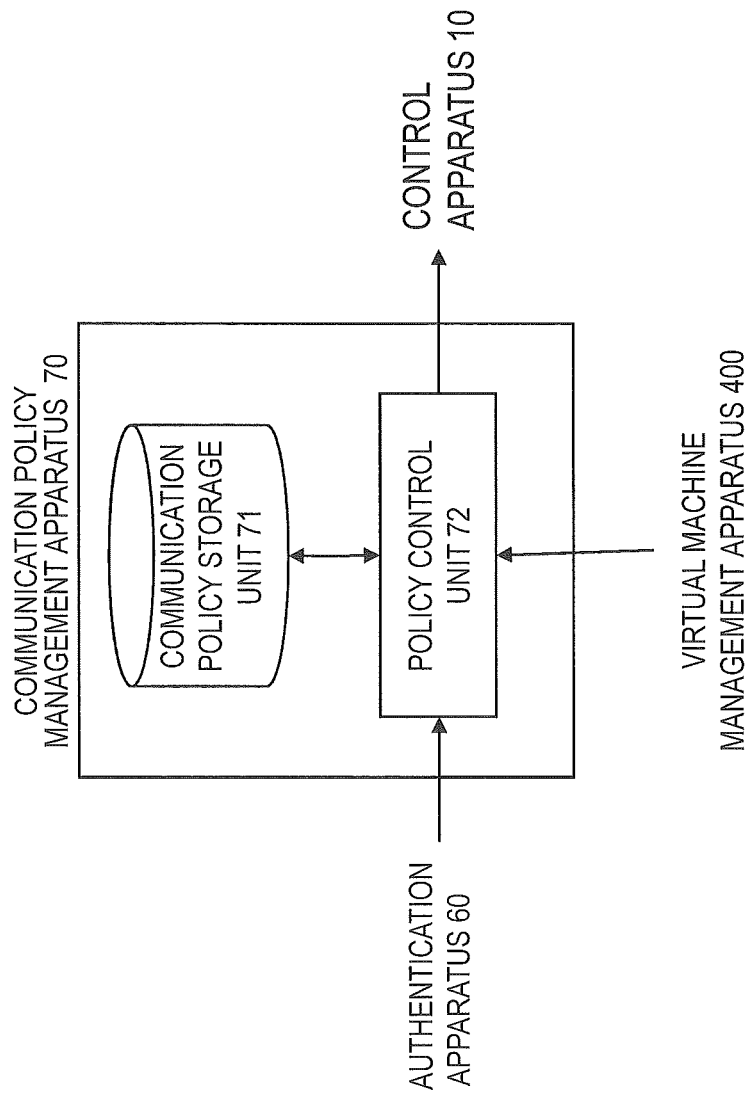
FIG. 14 illustrates a configuration of a communication policy management apparatus according to the second exemplary embodiment.

The role ID is an identifier for identifying information about access control. If the role ID is role_0001, for example, access to resource groups having resource groups ID resource_group_0001 and resource_group_0002 is permitted. The correspondence relationship between the role ID and the information about access control is stored in a communication policy storage unit 71 of the communication policy management apparatus 70 (FIG. 14). A resource group is a group of a plurality of virtual resources. A resource group ID is an identifier for distinguishing resource groups from each other.

The attribute information is information about a virtual machine created by the user terminal 50 (for example, an IP address or a MAC address).

For example, as illustrated in FIG. 13, when the authentication apparatus 60 succeeds in authentication of a user terminal having user ID 0001, the authentication apparatus 60 notifies the communication policy management apparatus 70 of 0001 as the user ID, role_0001 as the role ID, the IP address 192.168.100.1 and MAC address 00-00-00-44-55-66 as the attribute information.

In response to the request from the user terminal 50, the authentication apparatus 60 notifies the communication policy management apparatus 70 of new authentication information. For example, in response to the request from the user terminal 50, the authentication apparatus 60 notifies the communication policy management apparatus 70 of authentication information including a role ID changed to role_0002. Namely, for example, in response to the request from the user terminal 50, the authentication apparatus 60 notifies the communication policy management apparatus 70 of 0001 as the user ID, role_0002 as the role ID, and IP address 192.168.100.1 and MAC address 00-00-00-44-55-66 as the attribute information.

The authentication information is not limited to the example in FIG. 13. Arbitrary information may be used as long as the communication policy management apparatus 70 can determine an access rule for the user terminal 50 based on the information. For example, the authentication information may include positional information of the user terminal 50. In addition, the information transmitted from the authentication apparatus 60 to the communication policy management apparatus 70 is not limited to the authentication information. The user ID, the role ID, and positional information of the user terminal 50 may be used.

As illustrated in FIG. 12, in the second exemplary embodiment, the communication system includes the communication policy management apparatus 70. This communication policy management apparatus 70 determines an access rule indicating access authorization of the virtual machine 320 created by the user terminal 50 with respect to other virtual machines.

FIG. 14 illustrates a configuration of the communication policy management apparatus 70 in FIG. 12.

As illustrated in FIG. 14, the communication policy management apparatus 70 includes the communication policy storage unit 71 and a policy control unit 72.

The communication policy storage unit 71 stores communication policies and resource information.

FIG. 15 illustrates communication policies stored in the communication policy storage unit 71. As illustrated in FIG. 15, the communication policy storage unit 71 stores a resource group ID and access control information corresponding to the resource group per role ID. For example, when the access control information represents allow, access is permitted, and when the access control information represents deny, access is rejected. For example, the communication policy in the second row in FIG. 15 indicates that a virtual machine having role ID role_0001 is permitted (allow) to access a resource group having resource group ID resource_group_0002. Likewise, for example, the communication policy in the third row in FIG. 15 indicates that a virtual machine having role ID role_0002 is not prohibited to access the resource group having resource group ID resource_group_0001.

FIG. 16 illustrates resource information stored in the communication policy storage unit 71. As illustrated in FIG. 16, the communication policy storage unit 71 stores, per resource group ID, virtual resources included in a resource group and information about the virtual resources that are associated with each other. In FIG. 16, for example, the communication policy storage unit 71 stores a resource group identified by resource group ID resource_group_0001 and the resource group is associated with resource_0001, resource_0002, and resource_0003 as resources included in the group. In addition, the communication policy storage unit 71 stores information about each of the resources (for example, IP addresses, MAC addresses, and port numbers used for services).

Based on such communication policy and resource information stored in the communication policy storage unit 71 and authentication information supplied from the virtual machine management apparatus 400, the policy control unit 72 creates an access rule about access authorization of the virtual machine 320 created by the user terminal 50. The policy control unit 72 notifies the control apparatus 10 of the created access rule.

FIG. 17 illustrates access rules indicating access authorization of the virtual machine 320 created by the policy control unit 72 with respect to other virtual machines. In a source field in FIG. 17, information about the virtual machine 320, creation of which is requested by the user terminal 50, is stored (for example, an IP address or a MAC address). The information stored in the source field is created from the attribute field in the authentication information transmitted from the authentication apparatus 60 to the policy management apparatus 70.

In a destination field in FIG. 17, information about a virtual resource is stored (for example, the IP address of the resource, the MAC address of the resource, or resource information about a port number used for a service). The information stored in the destination field is created from the resource attribute field in the resource information stored in the communication policy storage unit 71.

In an access authority field in FIG. 17, information about access control is stored. The information stored in the access authority field is created from the access authority field in the communication policies stored in the communication policy storage unit 71.

In a condition (option) field in FIG. 17, for example, a port number used for a service set in the resource attribute field in the resource information stored in the communication policy storage unit 71 is set.

For example, as illustrated in the fourth row in the table in FIG. 17, the policy control unit 72 creates an access rule indicating that a virtual machine having source address 192.168.100.1 is prohibited (deny) to communicate with a virtual machine having a destination address 192.168.0.3 and notifies the control apparatus 10 of the access rule.

If change of a virtual machine arranged in a virtual resource 300 is caused, the policy control unit 72 updates a corresponding communication policy and resource information stored in the policy storage unit 71. For example, when the policy control unit 72 is notified of logical network information by the virtual machine management apparatus 400 and recognizes change of a resource in a resource group, the policy control unit 72 updates the correspondence relationship between the resource group ID and the resource ID included in the resource information.

For example, the communication policy management apparatus 70 according to the second exemplary embodiment creates, modifies, and deletes policies, in response to a request from the user terminal 50. Such communication policy management mechanism (policy management system) may be provided as a Web-based system or an application that operates on a separate PC (Personal Computer). In addition, the policy management mechanism of the communication policy management apparatus 70 can be provided through an application using GUI (Graphical User Interface). Alternatively, CLI (Command Line Interface) or an arbitrary mode may be used.

When notified of an access rule by the communication policy management apparatus 70, the control apparatus 10 calculates a packet forwarding path based on the access rule and determines a processing rule for realizing the calculated forwarding path. The control apparatus 10 notifies the forwarding node 20 and the virtual forwarding node 310 of the determined processing rule. The control apparatus 10 may set a valid period in the determined processing rule. In such case, the control apparatus 10 sets the valid period so that, when the valid period elapses after the processing rule is set in the forwarding node 210 and the virtual forwarding node 310 or after a packet matching the matching rule is received last, the processing rule is invalidated or deleted.

Figure 18:
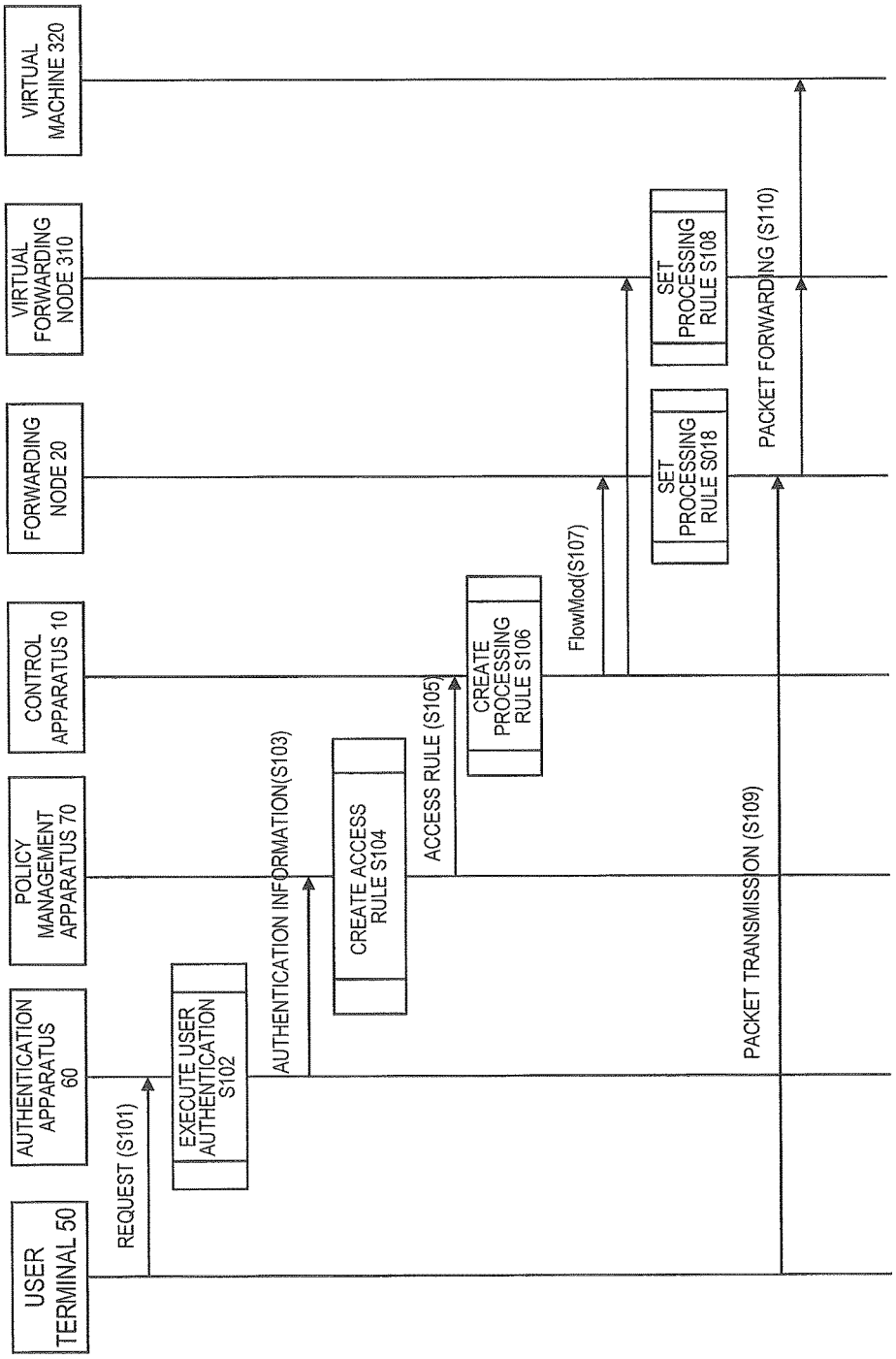
FIG. 18 is a sequence diagram illustrating an operation of the communication system according to the second exemplary embodiment.

An operation of the communication system according to the second exemplary embodiment will be described with reference to the drawings. FIG. 18 is a sequence diagram illustrating an operation of the communication system according to the second exemplary embodiment. In the operation in FIG. 18, the user terminal 50 transmits an instruction for change of an access rule by requesting the authentication apparatus 60.

In FIG. 18, the user terminal 50 requests the authentication apparatus 60 to execute authentication (step S101 in FIG. 18). The authentication apparatus 60 authenticates the user of the user terminal 50 (step S102 in FIG. 18). If the authentication apparatus 60 succeeds in authentication of the user terminal 50, the authentication apparatus 60 transmits authentication information to the communication policy management apparatus 70 (step S103 in FIG. 18).

Based on the supplied authentication information and the communication policy and resource information stored in the communication policy storage unit 71, the communication policy management apparatus 70 creates an access rule about access of the virtual machine 320 created in response to a request from the user terminal 50 (step S104 in FIG. 18). The communication policy management apparatus 70 transmits the created access rule to the control apparatus 10 (step S105 in FIG. 18).

When notified of the access rule by the communication policy management apparatus 70, the control apparatus 10 calculates a packet forwarding path based on the access rule and determines a processing rule for realizing the calculated forwarding path (step S106 in FIG. 18). The control apparatus 10 notifies the forwarding node 20 and the virtual forwarding node 310 of the determined processing rule (FlowMod in step S107 in FIG. 18).

The forwarding node 20 and the virtual forwarding node 310 receive the processing rule from the control apparatus 10 and set the processing rule (step S108 in FIG. 18).

The user terminal 50 transmits a packet addressed to the virtual machine 320 (step S109 in FIG. 18).

The packet transmitted from the user terminal 50 is sequentially forwarded to the forwarding node 20 and the virtual forwarding node 310. The forwarding node 20 and the virtual forwarding node 310 forward the packet in accordance with the processing rule set by the control apparatus 10 (step S110 in FIG. 18).

As described above, the communication system according to the second exemplary embodiment includes the communication policy management apparatus 70. If the communication policy management apparatus 70 receives an instruction for change of an access rule from the user terminal 50, a processing rule based on the change instruction can be previously set in the forwarding node 20 and the virtual forwarding node 310. Thus, according to the second exemplary embodiment, since the number of requests for processing rules from the forwarding node 20 or the virtual forwarding node 310 is reduced, load on the control apparatus can be reduced.

Third Exemplary Embodiment

A third exemplary embodiment is realized by adding a virtual machine movement apparatus 80 to the communication system according to the second exemplary embodiment. In the third exemplary embodiment, since the virtual machine movement apparatus 80 is arranged, a system capable of moving a virtual machine between virtual resources can be provided.

The third exemplary embodiment will be described with reference to the drawings.

Figure 19:
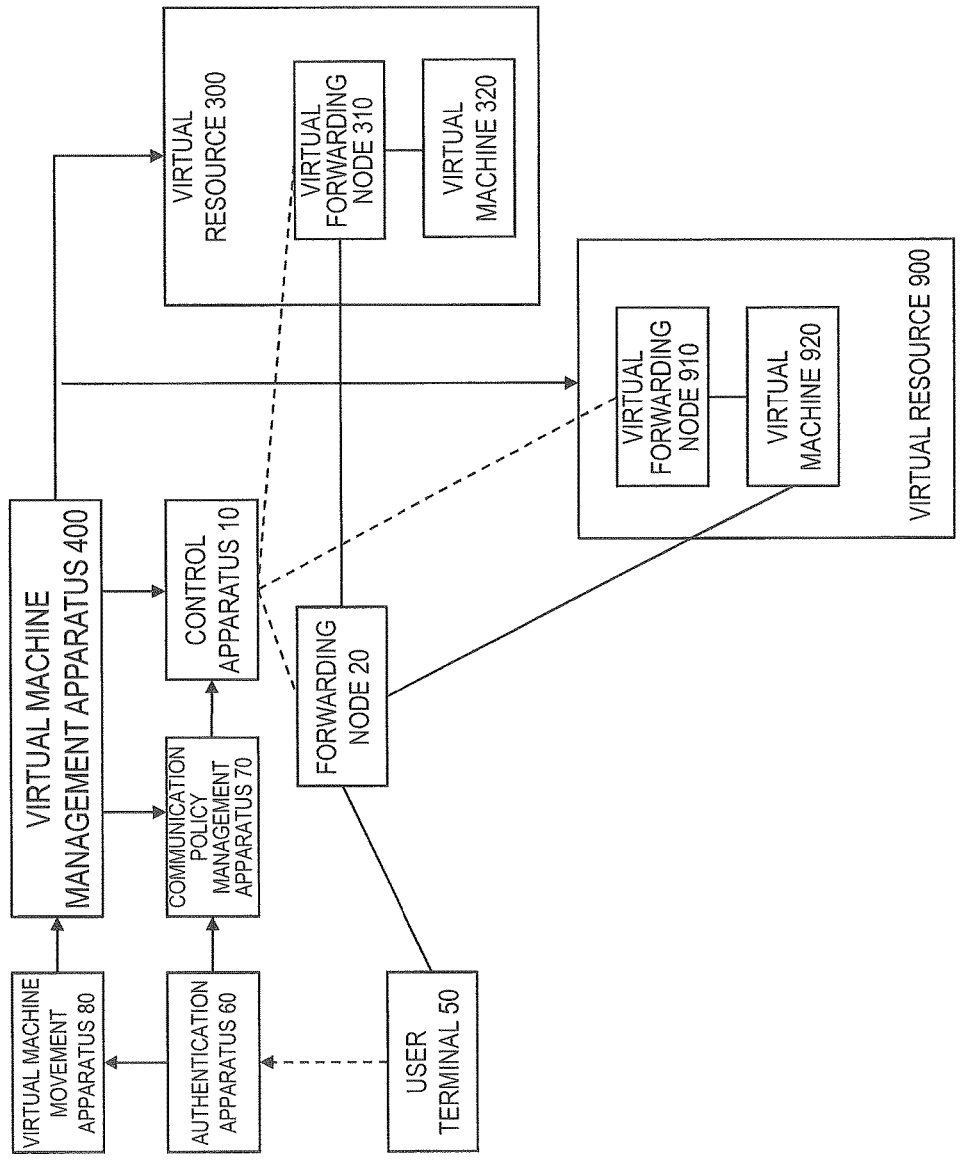
FIG. 19 illustrates a configuration of a communication system according to a third exemplary embodiment.

FIG. 19 illustrates a configuration of a communication system according to the third exemplary embodiment. As illustrated in FIG. 19, the second and third exemplary embodiments are different in that the virtual machine movement apparatus 80 is added to the communication system according to the third exemplary embodiment. Since other elements are the same between the second and third exemplary embodiments, the third exemplary embodiment will hereinafter be described with a focus on the difference.

For example, in response to a request from the user terminal 50 or based on an operational status of the virtual resource 300, the virtual machine movement apparatus 80 moves the virtual machine 320 included in the virtual resource 300 to another virtual resource 900.

In response to a request for movement of the virtual machine 320, the virtual machine movement apparatus 80 notifies the virtual machine management apparatus 400 of information about the destination of the virtual machine 320. The information about the destination of the virtual machine 320 is the virtual machine ID of a virtual machine that is requested to be moved by the user terminal 50. The information about the destination is not limited to the virtual machine ID. Arbitrary information may be used, as long as the information can identify the virtual machine that is requested to be moved by the user terminal 50.

When the virtual machine creation unit 430 of the virtual machine management apparatus 400 receives the information about the destination of the virtual machine 320 from the virtual machine movement apparatus 80, the virtual machine creation unit 430 refers to the logical network information stored in the management information storage unit 410 and determines the destination of the virtual machine 320.

After determining the destination of the virtual machine 320, the virtual machine management apparatus 400 moves the virtual machine 320 to the destination virtual resource 900. After moving the virtual machine 320, the virtual machine management apparatus 400 updates the logical network information. The virtual machine management apparatus notifies the control apparatus 10 of the updated logical network information.

Figure 20:
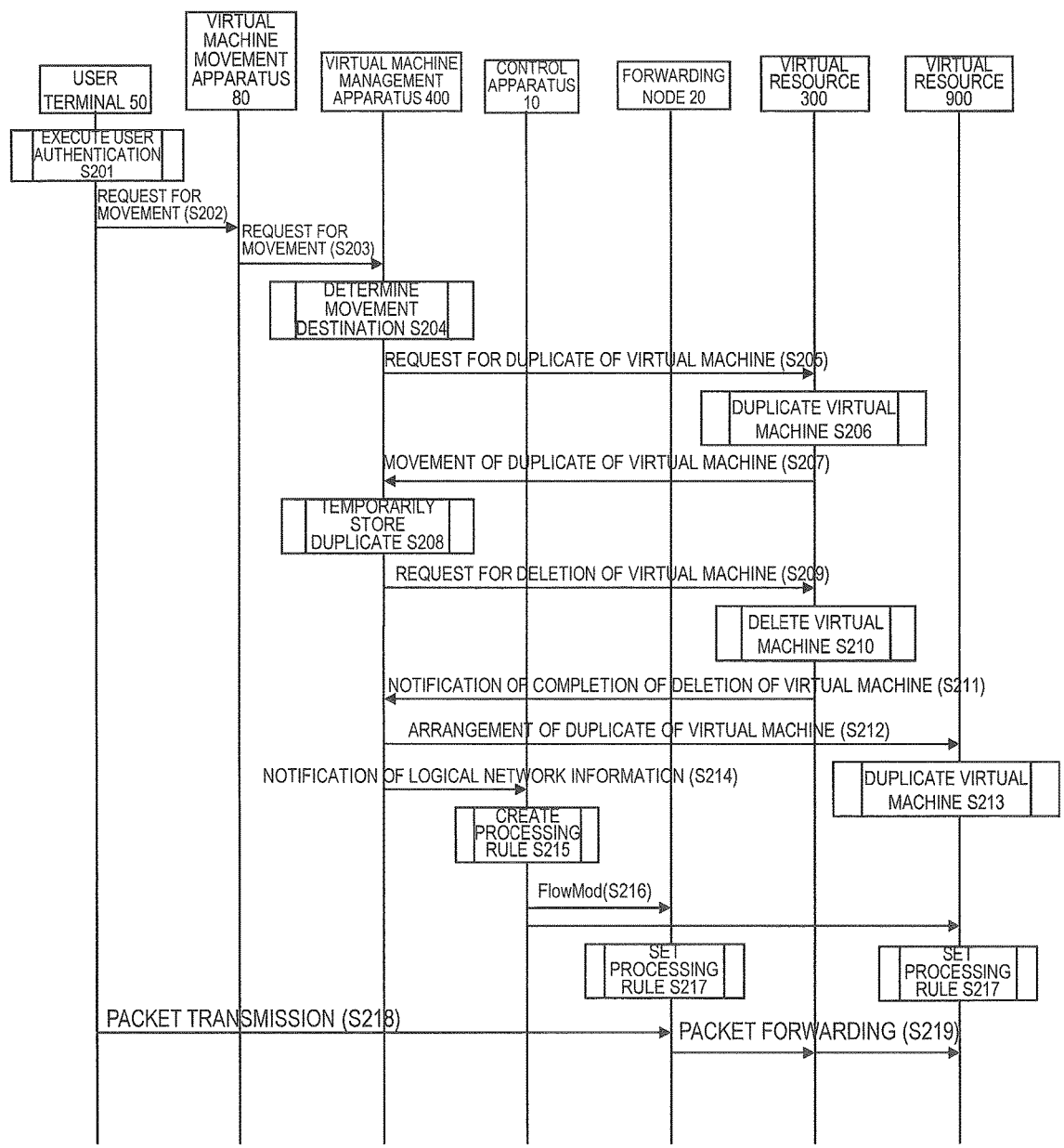
FIG. 20 is a sequence diagram illustrating an operation of the communication system according to the third exemplary embodiment.

An operation of the communication system according to the third exemplary embodiment will be described with reference to the drawings. FIG. 20 is a sequence diagram illustrating an operation of the communication system according to the third exemplary embodiment.

The user terminal 50 uses the authentication apparatus 60 for user authentication (step S201 in FIG. 20).

Next, the user terminal 50 transmits a request to the virtual machine movement apparatus 80 for movement of a virtual machine (step S002 in FIG. 20).

In response to a request for movement of the virtual machine 320, the virtual machine movement apparatus 80 notifies the virtual machine management apparatus 400 of information about the destination of the virtual machine 320 (step S203 in FIG. 20).

When the virtual machine creation unit 430 of the virtual machine management apparatus 400 receives the information about the destination of the virtual machine 320 from the virtual machine movement apparatus 80, the virtual machine creation unit 430 refers to the logical network information stored in the management information storage unit 410 and determines the destination of the virtual machine 320 (step S204 in FIG. 20).

The virtual machine management apparatus 400 requests the virtual resource 300 to create a duplicate of the virtual machine 320 (step S205 in FIG. 20).

In response to the request for a duplicate from the virtual machine management apparatus 400, the virtual resource 300 duplicates the virtual machine 320 (step S206 in FIG. 20) and notifies the virtual machine management apparatus 400 of the duplicated virtual machine 320 (step S207 in FIG. 20). The virtual machine management apparatus 400 receives and temporarily stores the duplicated virtual machine 320 in the image storage unit 420 (step S208 in FIG. 20). The virtual machine management apparatus 400 requests the virtual resource 300 to delete the virtual machine 320 (step S209 in FIG. 20). In response to the request for deletion of the virtual machine management apparatus 400, the virtual resource 300 deletes the virtual machine 320 (step S210 in FIG. 20) and notifies the virtual machine management apparatus 400 of completion of the deletion (step S211 in FIG. 20).

When notified of completion of the deletion of the virtual machine 320 by the virtual resource 300, the virtual machine management apparatus 400 notifies the virtual resource 900 of the duplicated virtual machine 320 temporarily stored in the image storage unit 320 (step S212 in FIG. 20). The virtual resource 900 receives the duplicated virtual machine 320 from the virtual machine management apparatus 400 and arranges the virtual machine 320 in the virtual resource 900 (step S213 in FIG. 20).

The virtual machine management apparatus 400 notifies the control apparatus 10 of the logical network information after the movement of the virtual resource 320 (step S214 in FIG. 20).

The control apparatus 10 receives information about an assigned network to which the virtual machine belongs from the virtual machine management apparatus 400 and creates a processing rule in accordance with the assigned network information (step S215 in FIG. 20).

The control apparatus 10 notifies the forwarding node 20 and the virtual forwarding node 910 in the virtual resource 900 of the created processing rule (FlowMod in step S216 in FIG. 20).

The forwarding node 20 and the virtual forwarding node 910 receive the processing rule from the control apparatus 10 and set the processing rule (step S217 in FIG. 20).

The user terminal 50 transmits a packet addressed to the virtual machine 320 (step S218 in FIG. 20).

The packet transmitted from the user terminal 50 is sequentially forwarded to the forwarding node 20 and the virtual forwarding node 910. The forwarding node 20 and the virtual forwarding node 910 determine packet forwarding and forward the packet, in accordance with the processing rule set by the control apparatus 10 (step S218 in FIG. 20).

As described above, the communication system according to the third exemplary embodiment includes the virtual machine movement apparatus 80. In this way, a virtual machine can be moved between virtual resources, and a processing rule that reflects the movement of the virtual resource can be previously set in the forwarding node 20 and the virtual forwarding node 910. Thus, according to the third exemplary embodiment, since the number of requests for processing rules from the forwarding node 20 or the virtual forwarding node 910 is reduced, load on the control apparatus can be reduced.

Fourth Exemplary Embodiment

A fourth exemplary embodiment according to the present invention is realized by redundantly forming the communication systems according to the third exemplary embodiment. By redundantly forming the communication systems, even if either one of the communication systems is stopped, services that have been provided by the stopped communication system can be continuously provided.

The fourth exemplary embodiment will be described with reference to the drawings.

Figure 21:
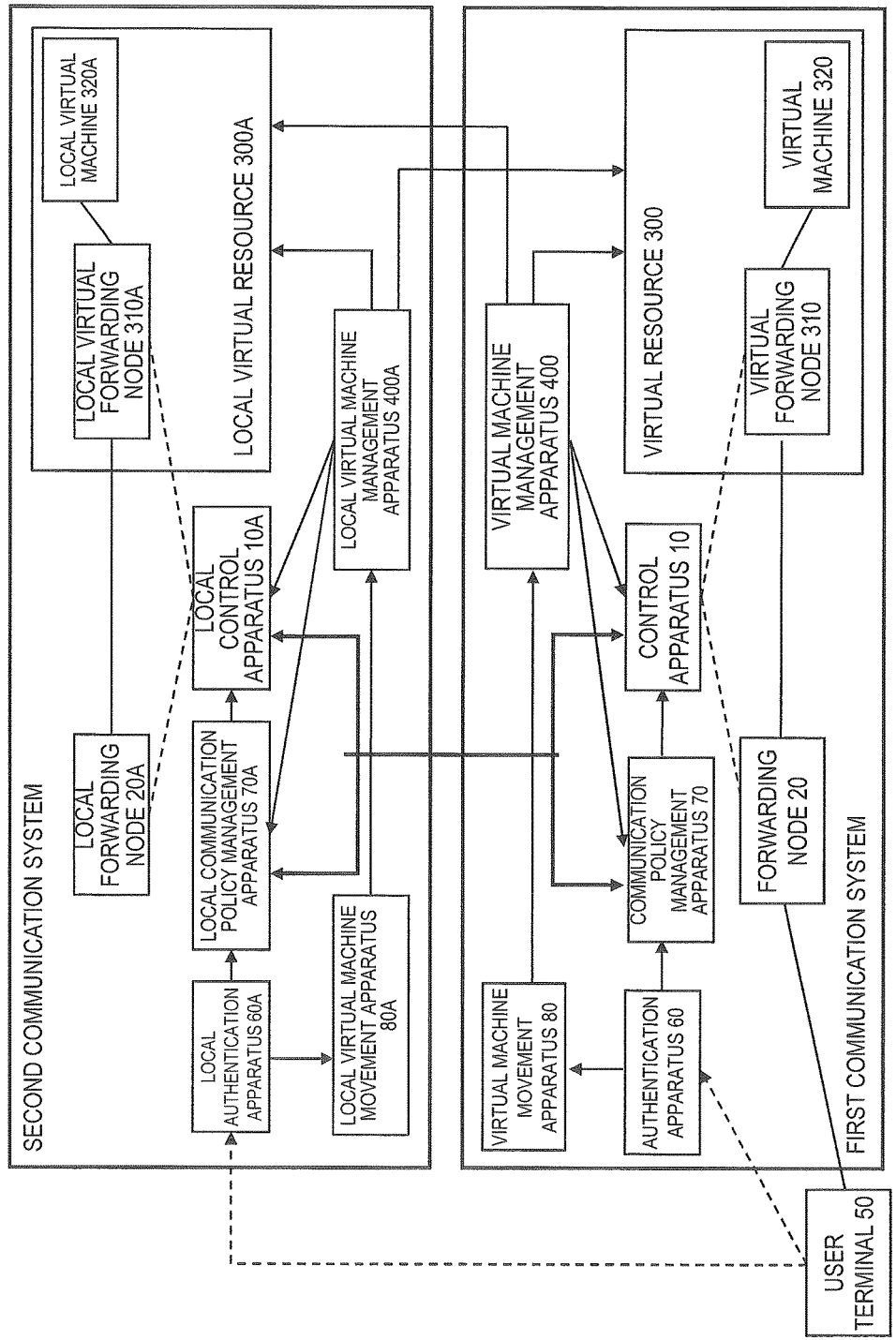
FIG. 21 illustrates a configuration of a communication system according to a fourth exemplary embodiment.

FIG. 21 illustrates a configuration of a communication system according to the fourth exemplary embodiment. As illustrated in FIG. 21, the difference between the third and fourth exemplary embodiments is that the communication system is formed redundantly. Since other elements are the same between the third and fourth exemplary embodiments, the fourth exemplary embodiment will hereinafter be described with a focus on the difference.

As illustrated in FIG. 21, the communication system according to the fourth exemplary embodiment includes a first communication system and a second communication system. Alternatively, the communication system according to the fourth exemplary embodiment may include several communication systems, in addition to the first and second communication systems. The first and second communication systems provide the same services. For example, the first communication system is established in a data center. For example, in contrast to the first communication system, the second communication system is established in a company via an external network such as via the Internet or a wide area network.

As illustrated in FIG. 21, the second communication system according to the fourth exemplary embodiment includes a local control apparatus 10A, a local forwarding node 20A, a local virtual resource 300A, a local virtual machine management apparatus 400A, a local authentication apparatus 60A, a local communication policy management apparatus 70A, and a local virtual machine movement apparatus 80A.

The local control apparatus 10A executes the same processing as that of the control apparatus 10 in the first communication system. The local forwarding node 20A executes the same processing as that of the forwarding node 20 in the first communication system. The local virtual resource 300A executes the same processing as that of the virtual resource 300 in the first communication system. The local virtual machine management apparatus 400A executes the same processing as that of the virtual machine management apparatus 400. The local authentication apparatus 60A executes the same processing as that of the authentication apparatus 60 in the first communication system. The local communication policy management apparatus 70A executes the same processing as that of the communication policy management apparatus 70 in the first communication system. The local virtual machine movement apparatus 80A executes the same processing as that of the virtual machine movement apparatus 80 in the first communication system.

The fourth exemplary embodiment will be described, assuming that the units included in the first communication system and the units included in the second communication system operate in synchronization with each other. The units included in the first communication system and the units included in the second communication system may operate independently, instead of in synchronization with each other.

In the fourth exemplary embodiment, the virtual machine management apparatus 400 receives a request for creation or setting change of a virtual machine from the user terminal 50 and creates a virtual machine in an arbitrary resource based on the request. In response to the request from the user terminal 50, the management information storage unit 410 of the virtual machine management apparatus 400 creates logical network information.

In the fourth exemplary embodiment, the virtual machine management apparatus 400 notifies the local virtual machine management apparatus 400A included in the second communication system of the created logical network information. Based on the supplied logical network information, the local virtual machine management apparatus 400A creates a local virtual machine 320A in the local virtual resource 300A. If the user terminal 50 transmits a request to the local virtual machine management apparatus 300A for creation or setting change of a virtual machine, the local virtual machine management apparatus 400A may notify the virtual machine management apparatus 400 of logical network information.

Likewise, in the fourth exemplary embodiment, if the user terminal 50 requests for change of an access rule, the policy management apparatus 70 notifies the control apparatus 10 and the local control apparatus 10A of a determined access rule. Based on the supplied access rule, the local control apparatus 10A calculates a packet forwarding path and determines a processing rule for realizing the calculated forwarding path. The local control apparatus 10A previously sets the determined processing rule in the local forwarding node 20A and the local virtual forwarding node 310A.

Likewise, in the fourth exemplary embodiment, if the user terminal 50 requests for movement of a virtual machine, the virtual machine management apparatus 400 notifies the local virtual machine management apparatus 400A of the logical network information updated after the virtual machine is moved. Based on the supplied logical network information, the local virtual machine management apparatus 400A moves the local virtual machine 320A.

An operation of the communication system according to the fourth exemplary embodiment will be described with reference to the drawings.

Figure 22:
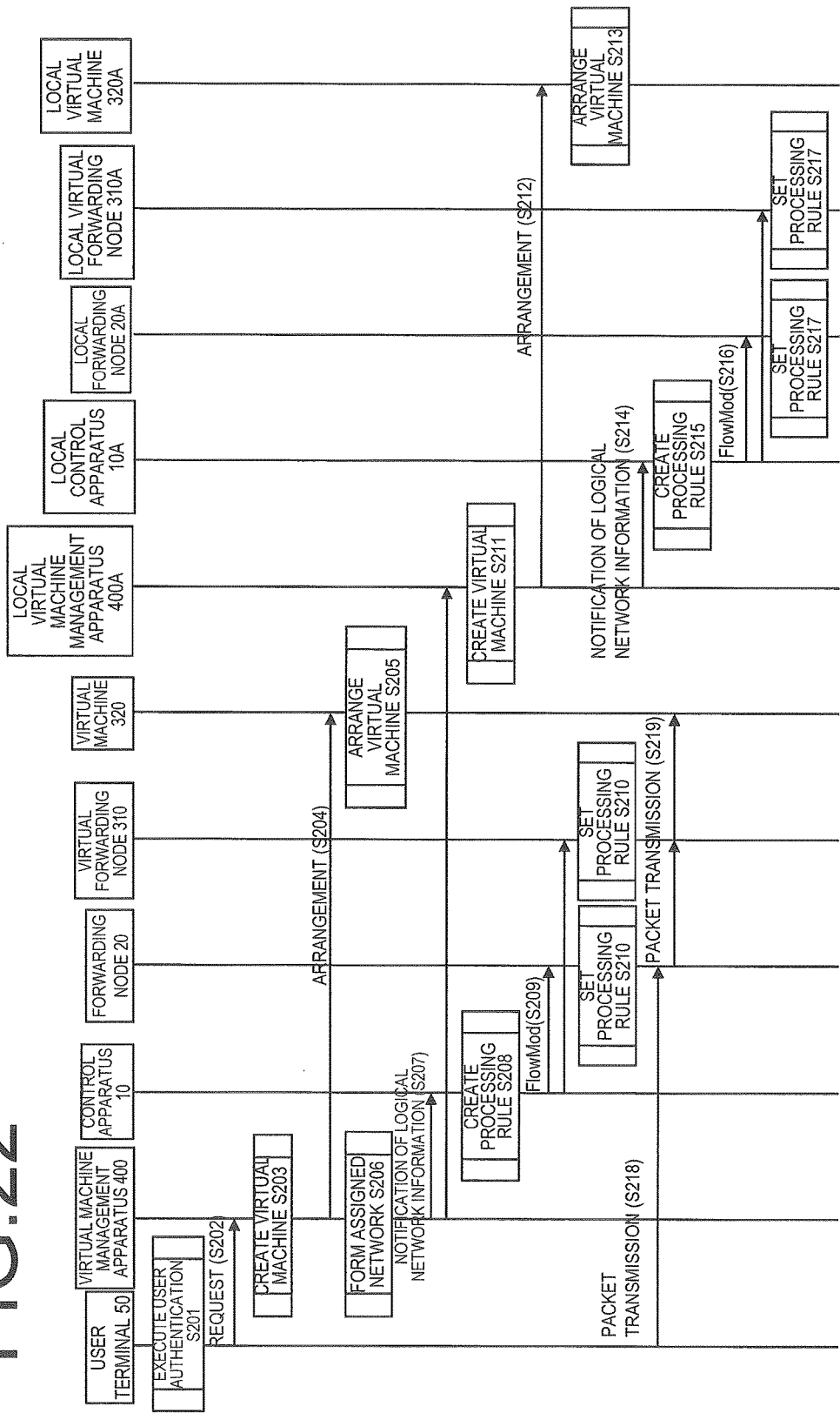
FIG. 22 is a sequence diagram illustrating an operation of the communication system according to the fourth exemplary embodiment.

FIG. 22 is a sequence diagram illustrating an operation of the communication system according to the fourth exemplary embodiment. In the operation in FIG. 22, the user terminal 50 transmits a request to the virtual machine management apparatus 400 for creation or setting change of a virtual machine.

The user terminal 50 executes user authentication (step S201 in FIG. 22).

Next, the user terminal 50 requests the virtual machine management apparatus 400 to create a virtual machine (step S201 in FIG. 22).

The virtual machine management apparatus 400 creates a virtual machine 320 in response to the request from the user terminal 50 (step S203 in FIG. 22) and executes a process of arranging the virtual machine 320 in a specified virtual resource 300 (step S204 in FIG. 22). The virtual machine 320 is arranged in the virtual resource 300 (step S205 in FIG. 22). The virtual machine management apparatus 400 creates a network to which the created virtual machine 320 belongs (step S206 in FIG. 22).

The virtual machine management apparatus 400 checks the user ID used for the user authentication with the user IDs in the virtual machine specification information stored in the management information storage unit 410. If the virtual machine specification information includes the user ID, the virtual machine management apparatus 400 notifies the control apparatus 10 of the logical network information (step S207 in FIG. 22).

If the virtual machine specification information does not include the user ID, the virtual machine management apparatus 400 registers a newly-assigned network ID for the user ID in the logical network information and notifies the control apparatus 10 of the logical network information in which the assigned network ID has been registered (step S207 in FIG. 22).

In the fourth exemplary embodiment, the virtual machine management apparatus 400 included in the first communication system also notifies the local virtual machine management apparatus 400A included in the second communication system of the logical network information (step S207 in FIG. 22).

The control apparatus 10 receives the information about the network to which the virtual machine belongs from the virtual machine management apparatus 400 and creates a processing rule in accordance with the assigned network information (step S208 in FIG. 22).

The control apparatus 10 notifies the forwarding node 20 and the virtual forwarding node 310 of the created processing rule (FlowMod in step S209 in FIG. 22).

The forwarding node 20 and the virtual forwarding node 310 receive the processing rule from the control apparatus 10 and set the processing rule (step S210 in FIG. 22).

In the fourth exemplary embodiment, after notified of the logical network information by the virtual machine management apparatus 400 in the first communication system, based on the logical network information, the local virtual machine management apparatus 400A creates the local virtual machine 320A (step S211 in FIG. 22) and arranges the local virtual machine 320A in a specified local virtual resource 300A (step S212 in FIG. 22). A local virtual machine 320A is arranged in the local virtual resource 300A (step S213 in FIG. 22).

The local virtual machine management apparatus 400A notifies the local control apparatus 10A of the logical network information (step S214 in FIG. 22).

The local control apparatus 10A receives the logical network information from the local virtual machine management apparatus 400A and creates a processing rule in accordance with the logical network information (step S215 in FIG. 22).

The local control apparatus 10A notifies the local forwarding node 20A and local virtual forwarding node 310A of the created processing rule (FlowMod in step S216 in FIG. 22).

The local forwarding node 20A and the local virtual forwarding node 310A receive the processing rule from the local control apparatus 10A and set the processing rule (step S217 in FIG. 22).

The user terminal 50 transmits a packet addressed to the virtual machine 320 (step S218 in FIG. 22).

The packet transmitted from the user terminal 50 is sequentially forwarded to the forwarding node 20 and the virtual forwarding node 310. The forwarding node 20 and the virtual forwarding node 310 forward the packet in accordance with the processing rule set by the control apparatus 10 (step S219 in FIG. 22).

Figure 23:
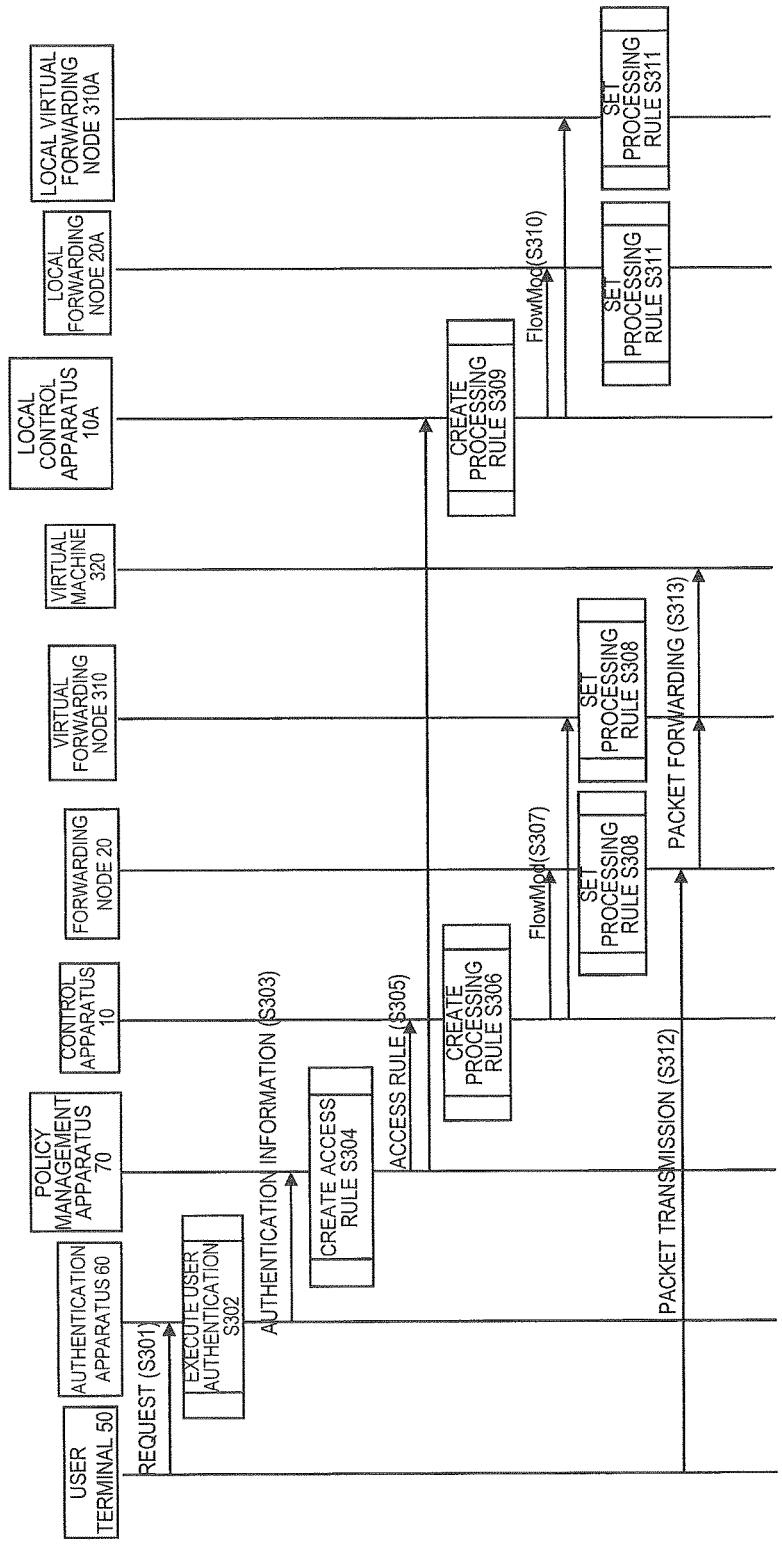
FIG. 23 is a sequence diagram illustrating another operation of the communication system according to the fourth exemplary embodiment.

FIG. 23 is a sequence diagram illustrating an operation of the communication system according to the fourth exemplary embodiment. In the operation in FIG. 23, the user terminal 50 transmits an instruction for change of an access rule by requesting the authentication apparatus 60.

In FIG. 23, the user terminal 50 requests the authentication apparatus 60 to execute authentication (step S301 in FIG. 23). The authentication apparatus 60 authenticates the user of the user terminal 50 (step S302 in FIG. 23). If the authentication apparatus 60 succeeds in authentication of the user terminal 50, the authentication apparatus 60 transmits authentication information to the policy management apparatus 70 (step S303 in FIG. 23).

Based on the supplied authentication information and the communication policies and the resource information stored in the communication policy storage unit 71, the communication policy management apparatus 70 creates an access rule about access of the virtual machine 320 created in response to a request from the user terminal 50 (step S304 in FIG. 23). The communication policy management apparatus 70 transmits the created access rule to the control apparatus 10 (step S305 in FIG. 23).

In the fourth exemplary embodiment, the communication policy management apparatus 70 in the first communication system also notifies the local control apparatus 10A in the second communication system of the created access rule (step S305 in FIG. 23).

When notified of the access rule by the communication policy management apparatus 70, the control apparatus 10 calculates a packet forwarding path based on the access rule and determines a processing rule for realizing the calculated forwarding path (step S306 in FIG. 23). The control apparatus 10 notifies the forwarding node 20 and the virtual forwarding node 310 of the determined processing rule (FlowMod in step S307 in FIG. 23).

The forwarding node 20 and the virtual forwarding node 310 receive the processing rule from the control apparatus 10 and set the processing rule (step S308 in FIG. 23).

In the fourth exemplary embodiment, after receiving an access rule from the policy management apparatus 70 in the first communication system, the local control apparatus 10A in the second communication system calculates a packet forwarding path based on the access rule and determines a processing rule for realizing the calculated forwarding path (step S309 in FIG. 23). The local control apparatus 10A notifies the local forwarding node 20A and the local virtual forwarding node 310A of the determined processing rule (FlowMod in step S310 in FIG. 23).

The local forwarding node 20A and the local virtual forwarding node 310A receive the processing rule from the local control apparatus 10A and set the processing rule (step S311 in FIG. 23).

The user terminal 50 transmits a packet addressed to the virtual machine 320 (step S312 in FIG. 23).

The packet transmitted from the user terminal 50 is sequentially forwarded to the forwarding node 20 and the virtual forwarding node 310. The forwarding node 20 and the virtual forwarding node 310 forward the packet in accordance with the processing rule set by the control apparatus 10 (step S313 in FIG. 23).

As described above, the communication system according to the fourth exemplary embodiment is formed redundantly. Thus, for example, when an apparatus such as the control apparatus 10 malfunctions or when a failure is caused in the network between the forwarding node 20 and the virtual forwarding node 310, if one of the communication systems is stopped, the services that have been provided by the stopped communication system can be provided continuously by the other communication system.

The entire disclosures of the above Patent Literatures and Non-Patent Literatures are incorporated herein by reference thereto. Modifications and adjustments of the exemplary embodiment are possible within the scope of the overall disclosure (including the claims) of the present invention and based on the basic technical concept of the present invention. Various combinations and selections of various disclosed elements (including each element of each claim, each element of each exemplary embodiment, each element of each drawing, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or sub-ranges falling within the disclosed range are also concretely disclosed even without specific recital thereof.

10 control apparatus
10A local control apparatus
11 topology management unit
12 control message processing unit
13 path and action calculation unit
14 forwarding node management unit
15 processing rule management unit
16 processing rule database
17 node communication unit
18 virtual resource management unit
20, 20-1, 20-2 forwarding node
20A local forwarding node
21 forwarding processing unit
22 table database (table DB) 22
23 processing rule management unit
24 communication unit
30 communication apparatus
40 communication apparatus management apparatus
50 user terminal
60 authentication apparatus
60A local authentication apparatus
70 communication policy management apparatus
70A local communication policy management apparatus
71 communication policy storage unit
72 policy control unit
80 virtual machine movement apparatus
80A local virtual machine movement apparatus
300 virtual resource
300A local virtual resource
310 virtual forwarding node
310A local virtual forwarding node
320 virtual machine
320A local virtual machine
400 virtual machine management apparatus
400A local virtual machine management apparatus
410 management information storage unit
420 image storage unit
430 virtual machine creation unit
900 virtual resource
910 virtual forwarding node
920 virtual machine

What is claimed is:
1. A communication system, comprising:
at least one node that is configured to request a processing rule for processing a packet; and
a controller, comprising:
a memory storing instructions; and
a processor configured to execute program instructions to:
notify the node of the processing rule in response to the request, wherein, upon being notified of a change of a network topology between a communication apparatus to which a packet is addressed and the node, the processor:

establishes the network topology based on information about a forwarding node and a virtual forwarding node;

determines a forwarding path for a packet addressed to the communication apparatus; and notifies the node of a processing rule for processing the packet based on the forwarding path, the processor further executing a communication apparatus management apparatus configured to manage the network topology between the communication apparatus and the node, wherein the communication apparatus management apparatus, upon changing the network topology between the communication apparatus and the node, notifies the processor of a change of the network topology, wherein the communication apparatus comprises a virtual machine(s) arranged in a virtual resources(s) by the communication apparatus management apparatus, wherein the communication apparatus management apparatus, upon arranging the virtual machine(s) in the virtual resource(s), notifies the controller of a change of a connection relationship between the virtual machine(s) and the node, the processor further executing:

a user terminal configured to request a creation of the virtual machine(s); and a communication policy management apparatus configured to manage an access rule indicating connectivity between the virtual machine(s), creation of which is requested the user terminal, and another virtual machine(s), wherein, based on the access rule supplied from the communication policy management apparatus, the processor determines a forwarding path for a packet, addressed to the virtual machine(s) and previously notifies the node of a processing rule for realizing the forwarding path.

2. The communication system according to claim 1, wherein the processor, upon being notified of the change of the network topology between the communication apparatus and the node, previously notifies the node of the processing rule for realizing the forwarding path.

3. The communication system according to claim 1, wherein the communication apparatus management apparatus, upon moving the virtual machine(s) from the virtual resource(s), notifies the controller of the change of the connection relationship between the virtual machine(s) and the node.

4. The communication system according to claim 2, wherein the controller notifies the node of the processing rule for realizing the forwarding path before the node receives the packet addressed to the communication apparatus.

5. A control apparatus, comprising:

a first processor that generates a processing rule for processing a packet and transmitting the processing rule to at least one node; and a second processor that, upon being notified of a change of a network topology between a communication apparatus to which a packet is addressed and the node:

establishes the network topology based on information about a forwarding node and a virtual forwarding node;

determines a forwarding path for a packet addressed to the communication apparatus; and notifies the node of a processing rule for processing the packet based on the forwarding path, wherein the second processor is notified of a change of the network topology between the communication apparatus and the node from a communication apparatus management apparatus that changes network topology, wherein the communication apparatus comprises a virtual machine(s) arranged in a virtual resource(s) by the communication apparatus management apparatus, wherein the communication apparatus management apparatus that has arranged the virtual machine(s) in the virtual resource(s) notifies the second processor of a change of a connection relationship between the virtual machine(s) and the node, and wherein, based on an access rule indicating connectivity between the virtual machine(s), creation of which is requested by a user terminal, and another virtual machine(s), the second processor determines a forwarding path for a packet addressed to the virtual machine(s) and previously notifies the node of a processing rule for realizing the forwarding path.

6. The control apparatus according to claim 5, wherein the second processor, upon being notified of the change of the network topology between the communication apparatus and the node, previously notifies the node of the processing rule for realizing the forwarding path.

7. The control apparatus according to claim 5, wherein the communication apparatus management apparatus that has moved the virtual machine(s) from the virtual resource(s) notifies the second processor of the change of the connection relationship between the virtual machine(s) and the node.

8. The control apparatus according to claim 6, wherein the second processor notifies the node of the processing rule for realizing the forwarding path before the node receives the packet addressed to the communication apparatus.

9. The control apparatus according to claim 6, wherein the second processor is notified of the change of the network topology between the communication apparatus and the node from a communication apparatus management apparatus that changes the network topology.

10. A communication control method, comprising:

by a controller, generating a processing rule for processing a packet;

notifying at least one node of the generated processing rule;

upon being notified of a change of a network topology between a communication apparatus to which a packet is addressed and the node:

establishing the network topology based on information about a forwarding node and a virtual forwarding node;

determining a forwarding path for a packet addressed to the communication apparatus;

notifying the node of a processing rule for realizing the forwarding path; and managing by the communication apparatus management apparatus, the network topology between the communication apparatus and the node, wherein the communication apparatus management apparatus, upon changing the network topology between the communication apparatus and the node, notifies the controller of a change of the network topology, wherein the communication apparatus comprises a virtual machine(s) arranged in a virtual resource(s) by the communication apparatus management apparatus, wherein the communication apparatus management apparatus, upon arranging the virtual machine(s) in the virtual resource(s), notifies the controller of a change of a connection relationship between the virtual machine(s) and the node;

requesting, by a user terminal, a creation of the virtual machine(s); and managing, by a communication policy management apparatus, an access rule indicating connectivity between the virtual machine(s), creation of which is requested by the user terminal, and another virtual machine(s), wherein, based on the access rule supplied from the communication policy management apparatus, a forwarding path is determined for a packet addressed to the virtual machine(s) and the node of a processing rule for realizing the forwarding path is previously notified.

11. The communication control method according to claim 10, wherein the controller, upon being notified of the change of the network topology between the communication apparatus and the node, previously notifies the node of the processing rule for realizing the forwarding path.

12. The communication control method according to claim 11, wherein the controller notifies the node of the processing rule for realizing the forwarding path before the node receives the packet addressed to the communication apparatus.

* * * * *